US012639730B2

(12) United States Patent　　　　　(10) Patent No.:　US 12,639,730 B2

Heinonen　　　　　　　　　　　　　　(45) Date of Patent:　May 26, 2026

(54) METHOD AND SYSTEM FOR GENERATING DATA RELATED TO A RECIPIENT

(71) Applicant: LastBot Europe Oy, Oulu (FI)

(72) Inventor: Tero Heinonen, Sacramento, CA (US)

(73) Assignee: LastBot Europe Oy, Oulu (FI)

( * ) Notice: Subject to any disclaimer, the term of this patent is extended or adjusted under 35 U.S.C. 154(b) by 0 days.

(21) Appl. No.: 18/971,945

(22) Filed: Dec. 6, 2024

(65) Prior Publication Data

US 2025/0190428 A1　　　Jun. 12, 2025

Related U.S. Application Data

(60) Provisional application No. 63/606,661, filed on Dec. 6, 2023.

(51) Int. Cl.

| | |
|---|---|
| *G06Q 30/0251* | (2023.01) |
| *G06F 16/22* | (2019.01) |
| *G06F 16/242* | (2019.01) |
| *G06F 16/2457* | (2019.01) |
| *G06F 16/28* | (2019.01) |
| *G06N 20/00* | (2019.01) |
| *G06Q 30/015* | (2023.01) |

(52) U.S. Cl.

CPC ..... *G06Q 30/0271* (2013.01); *G06F 16/2237* (2019.01); *G06F 16/2425* (2019.01); *G06F 16/2457* (2019.01); *G06F 16/285* (2019.01); *G06N 20/00* (2019.01); *G06Q 30/015* (2023.01)

(58) Field of Classification Search

None

See application file for complete search history.

(56) References Cited

U.S. PATENT DOCUMENTS

| | | | | |
|---|---|---|---|---|
| 12,182,733 | B2 * | 12/2024 | Nguyen | G06N 3/091 |
| 12,412,196 | B2 * | 9/2025 | Heinonen | G06Q 30/0201 |
| 12,423,312 | B1 * | 9/2025 | Symborski | G06F 16/2237 |
| 12,530,433 | B1 * | 1/2026 | Tabak | G06F 18/22 |
| 2025/0190428 | A1 * | 6/2025 | Heinonen | G06Q 30/0201 |
| 2025/0190868 | A1 * | 6/2025 | Heinonen | G06F 16/2457 |
| 2025/0321724 | A1 * | 10/2025 | Jung | G06F 8/41 |
| 2025/0322156 | A1 * | 10/2025 | Boucher | G06F 40/103 |
| 2025/0322300 | A1 * | 10/2025 | Massa | G06N 20/00 |
| 2025/0323702 | A1 * | 10/2025 | Kwon | H04L 41/16 |
| 2026/0025184 | A1 * | 1/2026 | Sun | H04B 7/0626 |

OTHER PUBLICATIONS

Quantifying Actionability: Evaluating Human-Recipient Models (Year: 2023).*

Metrics for evaluating the performance of machine learning based automated valuation models (Year: 2021).*

* cited by examiner

*Primary Examiner* — Kim T Nguyen

(74) *Attorney, Agent, or Firm* — Ziegler IP Law Group, LLC.

(57) ABSTRACT

A method and system for generating data related to a recipient by leveraging advanced machine learning and AI techniques. The method involves processing diverse input data sets, including structured and unstructured data, using AI models to generate initial outputs and iteratively refining these outputs based on performance metrics and real-world outcomes. The system dynamically adapts to evolving data and user contexts, ensuring high accuracy, efficiency, and scalability.

19 Claims, 11 Drawing Sheets

OBTAINING A PLURALITY OF DATA SETS
1702

ENRICHING DATA OF THE PLURALITY OF THE DATA SETS
1704

NORMALIZING THE DATA OF THE PLURALITY OF THE DATA SETS
1706

FORMING EMBEDDINGS OF THE NORMALIZED DATA
1708

USING MACHINE LEARNING TO FIND FROM THE EMBEDDINGS A TARGET EMBEDDING FOR A TARGET RECIPIENT
1710

METHOD AND SYSTEM FOR GENERATING DATA RELATED TO A RECIPIENT

TECHNICAL FIELD

The present disclosure relates generally to machine learning; more specifically, the present disclosure relates to a system and a method for generating data related to a recipient.

BACKGROUND

Efficient customer communication is important across industries for all entities such as companies, enterprises, and businesses. Yet determining optimal message content, product recommendations, and customer targeting for key initiatives such as sales, marketing, and retention poses a persistent challenge. The complexity of identifying ideal solutions for countless customer-product-message-outcome combinations exceeds human data processing capabilities. Recent advancements in Artificial Intelligence (AI) offer potential solutions. For example, Large language models (LLMs) like GPT facilitate scalable natural language generation, while multilayer perceptrons (MLPs) quickly learn complex representations. Integrating these technologies into a Reinforcement Learning (RL) system holds promise for AI-driven marketing and sales automation, continuously improving customer interactions.

Several solutions explore AI's role in enhancing marketing and sales, focusing on specific aspects of customer interaction. However, a comprehensive business optimization framework is lacking, particularly in data efficiency, multi-turn dynamics for dialog policy learning, and integrating domain ontology into dialog systems. Deep RL is acknowledged for constructing intelligent autonomous systems in Conversational AI. A Chatbot conversational model, leveraging contextual information for accurate responses, demonstrates RL's better alignment with human preferences compared to supervised methods.

Meta-learning for NLP illuminates task construction settings and applications, especially in recommendation systems, where RL optimizes long-term user engagement. Despite these techniques, a combination of optimizing messaging, products, targeting, and business objectives remains unexplored in prior systems.

Therefore, there is a need to address the aforementioned technical drawbacks in existing technologies in selecting data related to a recipient.

SUMMARY

The aim of the present disclosure is to provide a method and system for generating data related to a recipient. The aim of the disclosure is achieved by the method and system which generates data related to the recipient as defined in the appended independent claims to which reference is made to.

Embodiments of the present disclosure dynamically improve enterprise sales, marketing, and customer service. The present disclosure can efficiently sample high-performing messages, train from each customer interaction, and drive measurable gains on key business metrics. Additionally, the present disclosure provides an example of an artificial intelligence (AI)-based customer communication automation for entities (e.g., enterprises, and other organizations), proving its effectiveness over time by accelerating revenue growth and enhancing customer lifetime value.

These and other aspects of the disclosure will be apparent from the implementation(s) described below.

BRIEF DESCRIPTION OF DRAWINGS

Implementations of the disclosure will now be described, by way of example only, with reference to the accompanying drawings, in which.

DETAILED DESCRIPTION OF EMBODIMENTS

Figure 1:
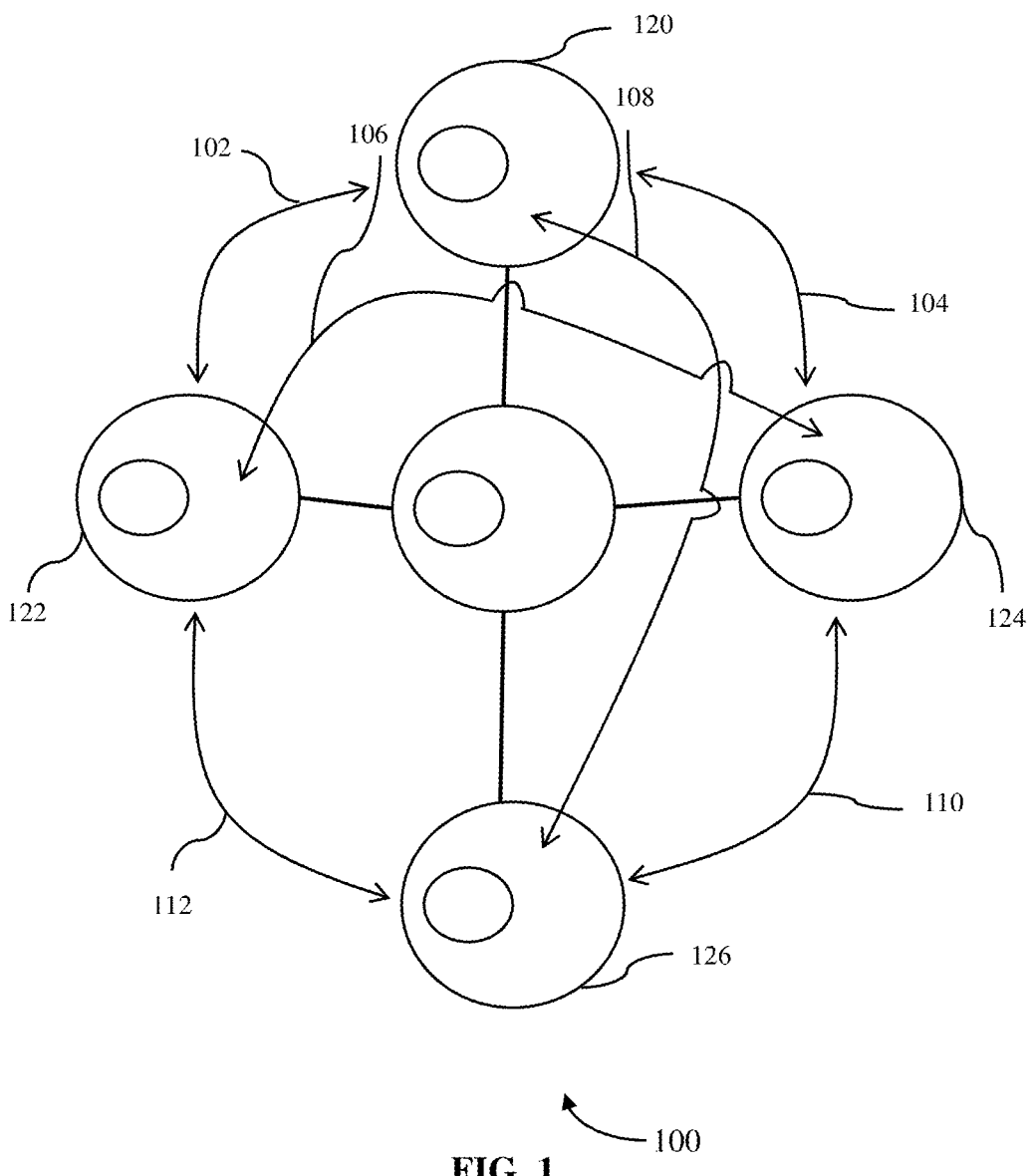
FIG. 1 is an exemplary diagram of a method that illustrates relations and interactions between a recipient and an entity (e.g., a business enterprise) in accordance with an implementation of the disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided a method for selecting data related to a recipient, the method comprising: obtaining a plurality of data sets; enriching data of the plurality of the data sets; normalizing the data of the plurality of the data sets; forming embeddings of the normalized data; and using machine learning to find from the embeddings a target embedding for a target recipient.

The one or more data sets may include personal data, transaction data, recipient data, marketing data, support data, partner data, and public data. Optionally, the one or more data sets include unstructured text, including product descriptions, recipient history, messaging, etc.

The method enriches the data of the one or more data sets using a data enrichment layer. The enrichment of the data includes adding inputs to the data enrichment layer with additional data. The additional data may be obtained from at least one of an external data source, or an internal data source. The enrichment of the data is a computational step that includes querying the internal data source or the external data source and its caches. The additional data is added to the input of the data enrichment layer if the additional data corresponding to any of the inputs is identified based on the computational step. For example, a third-party device may provide attributes related to the recipient, or alternatively, there may be a cache of recent contextual actions that can be added to the additional data. Optionally, the additional data is represented and concatenated in natural language.

The method normalizes the data of the one or more data sets using a Large Language Model (LLM) layer. The LLM layer normalizes the data to transform unstructured data and/or structured data into a format that is suitable for further training the ML layer considering interdependencies of the one or more data sets. The normalization of data includes extraction of the normalized data from the unstructured data using (i) the LLM layer and (ii) prompting. The LLM layer may extract key information from the unstructured data into a consistent normalized form using prompts and templates. The prompting may be template-based, dynamic or programmatic.

In the normalization of data, the one or more data sets are referred as, (i) recipient data set ($\Lambda$) with individual recipient data represented by $\lambda$, (ii) brand, product and deal data set (B), with individual brand, product and deal data represented by $\beta$, (iii) contextual data set ($\Gamma$), with individual contextual data represented by $\gamma$ and (iv) message data set ($\Delta$), with individual message data represented as $\delta$. The data sets $\Lambda$, B, $\Gamma$, and $\Delta$ are infinite-dimensional; however, the dimensionality is constrained by practical computing limitations.

The LLM layer normalizes the data to transform each data set $\lambda$, $\beta$, $\gamma$, and $\delta$ into their normalized forms $\lambda'$, $\beta'$, $\gamma'$, and $\delta'$. The LLM layer may include a transformer architecture to employ the normalization process. In addition, the transformer architecture utilizes positional encoding and multi-head attention, thereby enabling processing and semantic encoding of both scalar data and sequential dense or sparse data. For example, the scalar data may include the age of the recipient. For example, the sequential dense or sparse data may include purchase history or prior employment, effectively considering interdependencies and relations within each input. Optionally, the normalization of data is performed using any specific implementation of LLM. Optionally, a plurality of LLM layers (e.g., a Llama-2 70 billion parameter model) are employed to perform the normalization of data. Optionally, two or more of the plurality of LLM layers are used together to normalize the data partially or fully. The plurality of LLM layers may be interchangeable and may be replaced with another LLM from time to time.

The message data set ($\Delta$) may include a discrete set of possible messages that can be communicated with recipients defined for example from a dataset of previous messages with recipients, or previously defined set of messages desired. The discrete set of messages restricts the applicability only to those matters and discussions where a predetermined relevant message is available. The discrete set of message restricts the commercial applicability but at the same time guarantees that the messages are within the desired data set ($\Delta$). Optionally, the LLM layer samples an infinite-dimensional data set to analyze all possible messages corresponding to real-life applications where the messages are not constrained by a predefined set of messages. The LLM layer samples the message data set ($\Delta$). The normalized data $\lambda'$, $\beta'$, $\gamma'$ may be fed in the prompts to the LLM layer together with a prompt. The prompt may include a number and types of desired messages. The LLM layer may generate between 10-1,000 alternative messages; for example, the alternative messages can be 1, 5, 10, 50, 100, 250, 500, or 1000 messages. The LLM layer may generate a plurality of messages as the LLM layer has the benefits of being pretrained with a very large corpus of text covering such a high number of different real-life situations and contexts that a likelihood of at least one of the trained situations or contexts being relevant to the topic matter of the present situation is high, optionally being trained across the one or more data sets, and maintaining control over the sampled distribution.

The LLM layer may generate the plurality of messages by covering different semantic perspectives. The transformer architecture of the LLM layer supports the LLM layer to store previous message suggestions in a context and generates the plurality of messages that differ from the previous message suggestions in the same context. This inherent capability of the LLM layer can be invoked through prompting.

Optionally, to sample further away from the nominal messages a temperature of the LLM token sampling step can be adjusted, and alternative and custom sampling algorithms used and the LLM layer instructed in the context (as part of the prompt) of a desired type of messages and variation. This allows for achieving a targeted distribution of messages in the message data set ($\Delta$), either nearer to or distant from the nominal vector(s).

In addition, individual messages $\delta i$ during the generation of ordered set of messages $\delta 0$, $\delta 1$, . . . $\delta N$ against the prediction model for the predicted outcome for the message $\delta i$ can be evaluated. This evaluation can be invoked after a new token has been sampled from the logits, when a pattern denoting the end of an individual message is recognized.

The most recent message can then be extracted, the outcome predicted, and value tokens inserted into the output token sequence. These value tokens are configured to instruct the LLM of the expected value of the most recent message. The value tokens may be expressed in natural language, as numerical values encoded into tokens, or as specials tokens reserved for expressing the value. The value tokens are further configured to inform the LLM on the merits of each previously generated message $\delta i$. As the LLM attends previously generated messages with their value tokens while generating the next message, the value tokens implicitly help the LLM to guide its search in $\Delta$ towards the desired distribution, for example in the simplest case towards the highest predicted value.

This is favorable in comparison to explicit planning or search algorithms of the $\Delta$ as the present approach implements iteratively optimizing search of the message data set ($\Delta$) implemented solely in the token sequence space without the need for explicit search algorithms or higher-level abstractions such as trees of thoughts.

Further benefit of this approach for sampling and search is that as it relies on the basic characteristics of modern LLMs it directly benefits from any accelerations of the inference frameworks such as speculative sampling, optimization of attention and linear layers, distilled and sparse models.

The evaluation and injection of value tokens can be performed while processing the same token sequence and keeping the transformer state resident in the GPU, resulting in O(n2) time complexity with respect to the number of messages n or more precisely the token length of these messages. This is much favourable to a scenario where the sequence would be restarted separately for each message prompted by all previous messages, where the time complexity is O(n3). Also, any optimization of the LLM transformers algorithm such as sparse attention or parallel processing which can reduce O(n2) time complexity will directly benefit the resent system correspondingly.

For practical implementation, the number of messages N to meet the real-time requirements of the current use case can be adjusted. A lower N will mean reduced exploration of the message data set ($\Delta$) and higher N will result in expanded exploration.

For example, for an interactive voice response, 50 ms for generating the candidate messages may be allocated and choosing the optimal message and set N=10, while for an email response N=1,000 to optimize between the response time and coverage of search may be chosen. Even at the limit of N=1 the sole sampled message is reasonable and useful as it is conditioned on the in-context information $\lambda'$, $\beta'$, $\gamma'$ that the LLM can leverage applying its learned information. Besides the time complexity, another practical upper limit for N is the context window of the LLM, or in the era of extended context windows (such as through fractional positional encodings) the effective context length which still provides sufficient recall, for example 2k tokens for Llama 2 7B, 24k for Claude 2.1, and 64k for OpenAI's GPT4Turbo. As the LLM is used as a sampler, the present method also tolerates less than perfect recall allowing the use of extended context window.

It is important to note that as a sampler of the message data set ($\Delta$) in the context of the RL framework, the goal of sampling is not to maximize expectation but provide a controllable method to manage the sampled distribution to reach the desired balance between exploitation and exploration.

The LLM layer is utilized as an efficient sampler of the message data set ($\Delta$), where the distribution of samples is shaped with one or more control parameters and achieved desired properties of the output distribution with a sample efficient method.

The method may sample the brand, product, and deal data set (B) from at least one of an enumerated discrete data set or a generated infinite data set. For example, the enumerated discrete data set can be a product inventory. Further, the method may analyze new products or deals, or changes to existing products. The method may analyze whole product portfolios, bundling, pricing models, etc.

The method may use generative capabilities of the LLM layer to analyze the brand, product, and deal data set (B) to support a new product introduction, market demand analysis, segmentation, and simulation. For example, the method may sample all existing products against all known recipients and select an optimum message for each recipient. This enables not only determining the optimal message, but also the optimal customer-product-message combinations. Alternatively, the method defines a new product by creating its textual description and verifies the new product with a defined segment of the recipients. The method may simultaneously optimize each message for each individual recipient which provides unprecedented capabilities to the method to evaluate new products, offerings, and bundles against trained data. This insight informs product management, marketing, and enterprises of how their recipients may respond to new ideas and offerings, and where they have to target their product.

The method forms embeddings of the normalized data, e.g., a first embedding, a second embedding, and a third embedding of the normalized data. The method may embed the normalized data into fixed-dimension dense vector representations using the LLM layer as fixed feature extractors.

The normalized data $\lambda'$, $\beta'$, $\gamma'$, and $\delta'$ may be projected into fixed-length embedding data sets using an encoder or encoder-decoder LLM or its derivatives. For example, the encoder-decoder LLM can be Bidirectional Encoder Representations from Transformers (BERT). The encoder-decoder LLM may map textual presentations into an embedding data set subject to a semantic proximity condition. These embeddings are then combined into a joined embedding vector in a predetermined order. The joined embedding vector may represent a specific transformed and normalized data point.

For example, let $\Sigma$ represent $R^d$ data set of all embeddings. The individual embedding vectors within this data set may be represented by $\sigma$ with a subscript to denote specific vectors (e.g., $\sigma_1$, $\sigma_2$, . . . , $\sigma_n$).

In case there are multiple recipients $\lambda$, brands, products and deals $\beta$, contextual data $\gamma$, and messages $\delta$, the $\sigma$ ca be created for all combinations or a desired subset of combinations of them leading to a total of n embedding vectors $\sigma_1$, $\sigma_2$, . . . , $\sigma_n$ and a machine learning step is applied separately for each of them.

The method uses machine learning to find from the embeddings a target embedding for a target recipient. A Machine Learning (ML) layer that is trained with data points to optimize specified outcomes (i.e. expected outcomes). The data points may be created from an encompassing reinforcement learning framework. The ML model is trained using customary training methodologies and algorithms. The ML model may obtain the embeddings, e.g., the first embedding, the second embedding, and the third embedding as inputs in $\Sigma$ data set that includes recipient, brand, product, deal, context, and message data. The ML model may be trained based on an output of the embeddings and may predict a sum of outcomes of a specific message delivered to a specific recipient at that moment and in the presence of contextual data. The outcomes may be defined by the entity and they apply to a specific recipient. For example, the outcomes may include purchases, clicks, satisfaction metrics, lifetime value, or other metrics. Each outcome has an associated economic value, which may be positive, zero, or negative. The value associated with an outcome may be derived from the business strategy, marketing and sales objectives, business KPIs, financial objectives, or similar metrics of the entity.

The ML model is continuously trained based on prior outcomes in the background. Optionally, the ML model is continuously retrained by incorporating new outcomes trained into the ML model in near real-time.

The method according to the present disclosure optimizes communications and interactions with the recipients, e.g., customers or users in real-time. The method may employ an advanced reinforcement learning (RL) framework that leverages large language models (LLMs) and continuously trained machine learning (ML) model for example deep multilayer perceptron (MLP) networks to optimize messaging, product recommendations, and recipient, e.g., a customer is targeted to maximize the specified outcomes (e.g., business outcomes). The method may implement machine learning ML using other methods comprising of support vector machines, decision-trees, random forests, gradient boosting machines, K-nearest Neighbors (kNN), naïve bayes, logistic regression, linear regression, principal component analysis (PCS) or other deep learning models than MLP.

The method may enable a customer dialog using a partially observable Markov Decision Process (MDP), where the method maximizes an expectation or another desired function of cumulative outcome distribution.

The method dynamically improves enterprise sales, marketing, and customer service. The method can efficiently sample high-performing messages, train from each recipient interaction, and drive measurable gains on key metrics related to the business. The method provides an artificial intelligence (AI)-based customer communication automation for entities, proving its effectiveness over time by accelerating revenue growth and enhancing customer lifetime value. The method integrates LLMs for message generation and data normalization with an efficiently trained ML for real-time training and inference. The method enables easy integration of new data sources, the new outcomes, and LLMs to accommodate evolving business needs.

The method achieves efficient machine learning through normalization and embedding steps, which facilitate the utilization of standard ML architectures such as MLP. Alternative input formats and contents may be abstracted into a fixed-dimensional dense semantic vector data set. The normalization of data may handle missing data by reconstructing, approximating, or estimating it from existing data, or representing it in a consistent encoding in an embedding data set. As a result, the method integrates the missing data into a parallel online training pipeline, eliminating the need for explicit handling of missing data at subsequent stages.

The method performs parallel continuous automated training and continuous deployment that enable ML model improvement without downtime or human interaction. The method performs continuous retraining to improve the performance of the ML model even in the absence of new outcomes since the previous retraining. The lack of outcomes serves also as new information that improves the ML model's performance. For example, if the recipient continues to not respond to a cold email, the ML model may change the expected value of similar messages in the same situation.

The method may be characterized as a Reinforcement Learning (RL) technique to train the LLM layer based on an optimal policy that maps states to actions that maximize an expected cumulative reward over time. The adaptive nature of the RL and the ML is combined to train the LLMs, thereby allowing the method to manage the complexity of real-world business environments. The dynamically trained ML may serve as a value function approximator in the observable Markov Decision Process (MDP). The MDP involves partial observability, with explicit states, e.g., context, while the recipient's mental processes remain unobservable.

In an example, the following may be defined.

State S is the state of the current communication context, including $\lambda'$, $\beta'$, $\gamma'$, and $\delta'$.

Action A is the message $\Delta(\omega)=\delta$ that is selected based on the state S.

Optimal Policy is a stochastic policy for choosing an Action from a distribution of potential actions. The policy maps the State S into action A by first generating an ordered set of candidate messages using LLM $\delta_0$, $\delta_1$, ... $\delta_N$, where each message $\delta_i$ is conditioned to the State a and previous messages $\delta_0$, $\delta_1$, ... $\delta_{i-1}$ and the corresponding predicted Rewards R $r_0$, $r_1$, ..., $r_i$, and secondly stochastically selecting a message $\delta$ by applying a stochastic sampling function on the R distribution selecting $R(\omega)=r_i$ and $\delta=\delta_i$.

Reward predictor $R^\wedge(S, \delta)$ is a known ML model for example a deep neural network that is used to learn optimal mapping from state S and a message $\delta$ to Reward R.

Reward or value function R is the sum of business outcomes each as discounted to the time of the message $$\Sigma(\text{Value}_{outcome} f(T_{outcome} - T_{message})).$$

Thereby result is a combination of the following strategies. Neural-Fitted Algorithms, where the ML is the continuously learned part of the system, which learns to map message $\delta$ to Reward R conditional to State S. Policy Iteration, where the $R^\wedge$ is continuously learned and retrained for every additional tuple S, $\delta$, r.

MCMC sampling of the candidate messages $\delta_0$, $\delta_1$, ... $\delta_N$ for each State S where each message $\delta_i$ is conditioned to the previous messages and their predicted Reward R and are selected stochastically in a Markov Chain process.

Thus, the present method and system does not learn policy selection function directly, instead it learns Reward function predictor $R^\wedge$.

Consequently there are no direct RL hyperparameters to the learning such as learning rate or discount factor and effectively hyperparameters are implicit in the deep neural network implementing the $R^\wedge$. The present method and system uses MCMC sampling to explore the message data set ($\Delta$) conditioned also predicter rewards $r_0$, $r_1$, ..., $r_i$ from the reward predictor $R^\wedge$. The real State $S_{real}$ is partially and weakly observable as that also includes the state of mind of the end-customer which is only indirectly and partially observable in the State S. The real State $S_{real}$ is also continuously affected by actions outside the method and system described herein.

The method can sample the message data set $\Delta$ efficiently and controllably in proximity to nominal vectors, thereby enabling improved performance even at the beginning of training. The method exhibits performance akin to human capabilities even in the absence of explicit training data, leveraging the inherent training embedded within the LLMs, which are employed for message sampling.

The method may use pre-trained LLM models, thereby eliminating the need to subject the LLM for training or fine-tuning and the risk of data leakage between different customer environments through the LLMs.

The method may wholly or partially train or fine-tune the LLM models using the ML estimate to improve the LLM model responses. The method may connect the LLM and ML into a single model, where all the weights of the model are trained together. The method may freeze some layers of the LLM while training some other layers. The method may implement one or a plurality of LORA (Low-Rank Adaptation of Large Language Models) to fine-tune the LLM model behavior and outputs using a lightweight technique, that significantly reduces the number of trainable parameters.

The machine learning model (ML) such as multilayer perceptron (MLP) model is built within a robust security infrastructure, ensuring its operation remains confined to authorized usage. This encapsulated environment for the ML model reinforces security protocols, making the method a reliable solution for handling and processing sensitive data without compromising the privacy or data integrity of the recipient information.

Thus, in light of the foregoing discussion, the present disclosure provides another embodiment a method for generating data related to a recipient, the method comprising: identifying one or more performance metrics associated with selecting data related to the recipient, the performance metrics arranged to quantify one or more aspects of interest related to the recipient; receiving one or more input data sets relevant to the recipient; receiving one or more instructions defining operations to be performed in relation to the one or more input data sets; using a first AI model, configured to analyze at least one of the one or more input data sets in combination with one or more instructions, to generate first output data; applying a machine learning model to the first output data to calculate one or more performance metrics configured to assess the one or more aspects of interest related to the recipient; providing the calculated one or more performance metrics to a second AI model; using the second AI model, configured to process the one or more performance metrics in combination with one or more input data sets, to generate second output data aligned with desired performance metrics; and iteratively refining generation process, and repeating the steps until a criterium for completion has been satisfied.

The method improves personalization, efficiency, and accuracy in generating optimized outputs, such as tailored messages or recommendations. It enhances data integration by handling diverse and complex data types, scales decision-making through AI-driven automation, and boosts outcomes by refining outputs iteratively to align with specific performance metrics. This leads to better customer engagement, higher conversion rates, and streamlined business processes.

The method thus enables to generate optimized, data-driven outputs tailored to a recipient's specific context and preferences. It achieves this by iteratively processing diverse data sets (structured and unstructured), refining outputs through AI and machine learning models, and aligning the results with predefined performance metrics. For example, the outputs may comprise personalized messages, product recommendations, or actionable insights for marketing and customer engagement.

In the step of identifying one or more performance metrics associated with selecting data related to the recipient, the system establishes clear, measurable objectives to evaluate the success of the process. These metrics may relate to outcomes such as engagement rates, sales conversions, or emotional resonance in communications. Defining these metrics ensures that subsequent steps are directed toward achieving quantifiable goals, such as crafting a message that increases email open rates.

In the step of receiving one or more input data sets relevant to the recipient, the system gathers structured data (e.g., demographics, transaction history) and/or unstructured data (e.g., past communications, reviews). This comprehensive collection of data enables the system to have a well-rounded context for personalized and accurate processing.

In the step of receiving one or more instructions defining operations to be performed in relation to the one or more input data sets, the system interprets specific guidelines that dictate both the method of processing the data and the desired outcomes. For example, an instruction might request the generation of an email subject line designed to elicit a positive emotional response. These instructions ensure the output is aligned with the user's goals.

In the step of using a first AI model configured to analyze at least one of the one or more input data sets in combination with one or more instructions to generate first output data, the system employs an AI model to process the input data and produce an initial result. This step represents the first layer of analysis and content creation, such as generating draft suggestions for personalized messages or recommendations.

In the step of applying a machine learning model to the first output data to calculate one or more performance metrics configured to assess the one or more aspects of interest related to the recipient, the system evaluates the quality of the initial output. This evaluation compares the output against the predefined metrics, predicting its success or alignment with the desired objectives, such as the likelihood of a recipient engaging with a message.

In the step of providing the calculated one or more performance metrics to a second AI model, the system feeds the performance evaluation results back into a secondary AI model for further refinement. This feedback enables the next phase of processing to adjust and optimize based on measurable insights, ensuring that the final output aligns more closely with the desired outcomes.

In the step of using the second AI model configured to process the one or more performance metrics in combination with one or more input data sets to generate second output data aligned with desired performance metrics, the system refines the initial output by applying adjustments informed by the calculated metrics and original data. This refinement improves precision and alignment with the specified goals, such as creating a message that better resonates with the recipient's preferences.

In the step of iteratively refining the generation process and repeating the steps until a criterium for completion has been satisfied, the system loops through the process, reintroducing refined output as part of the input for further enhancement. This continuous cycle ensures the output improves progressively, achieving optimal alignment with performance metrics before completion. For example, through repeated iterations, an email subject line may become more compelling, striking the perfect balance between tone, clarity, and relevance.

The input data sets may comprise structured data or unstructured data or both structured data and unstructured data.

The instructions can be in practice for example "Create a subject line to a cold email, intended to cause a favorable emotional response using all the information about the brand, product, deal, and the recipient". The information is part of input data sets. The instructions may comprise both how to process the input data sets as well as what is the goal of processing.

The operations to be performed in relation to the one or more input data sets means that how the one or more input data sets are to be processed or how the optimization goal is to be addressed.

The AI model may be a generative model, a reinforcement learning model, a language model, or a machine learning-based model. A machine learning-based model refers to any model that utilizes machine learning approaches, such as regression or classification models.

The machine learning model comprises at least one of: a large language model, a transformer model, a diffusion model, of neural network, multilayer perceptron (MLP), support vector machines, decision-trees, random forests, gradient boosting machines, K-nearest Neighbors (kNN), naïve bayes, logistic regression, linear regression, or principal component analysis (PCS).

Refining comprises reintroducing the second output data as a part of the input data sets.

According to the embodiments of generating data related to the recipient, iterative refining may comprise introducing the second output data directly as the first output data for further processing or the iterative refining may comprise introducing the second output data as part of the input data sets, to be processed alongside other input data. By choosing the appropriate option, the method adapts to either narrow-focus optimization or holistic integration, depending on the requirements of the task.

Introducing the second output data directly as the first output data for further processing enables rapid and focused refinement by using the output of the previous iteration as the starting point for the next cycle. It simplifies the processing loop, concentrating solely on refining the specific result. This is particularly effective when the goal is to fine-tune a narrowly defined output, such as adjusting the tone or phrasing of a single message. By eliminating unrelated inputs, the system achieves more precise and targeted improvements.

Introducing the second output data as part of the input data sets, to be processed alongside other input data enables more comprehensive refinement by incorporating the improved output into the broader context of the input data. It allows the system to re-evaluate and adjust the output in light of all related data, ensuring consistency and alignment with the overarching goals. This is ideal for scenarios where the output must fit within a larger framework, such as creating a marketing strategy that integrates customer insights, product details, and contextual factors.

It enhances the richness and relevance of the refinement process by considering the output in its full context.

The at least one performance metric may represent a predicted outcome in response to the first output data, the outcome encompassing actions, events, or changes in the physical or virtual world. This improves the relevance, effectiveness, and decision-making in the system's output generation process. By representing a predicted outcome as a performance metric, the system can focus on outputs that are more likely to drive desired actions or events in the real world, whether they involve customer engagement, sales conversions, or operational efficiencies.

Optionally, the one or more performance metrics may be calculated using the first output data in conjunction with at least one of the one or more input data sets. This improves the contextual relevance and accuracy of the performance evaluation process. By calculating performance metrics using the first output data in conjunction with input data sets, the system ensures that evaluations are grounded in the broader context and underlying data relationships. Integrating input data ensures the performance metrics reflect how well the output aligns with the original data, leading to more informed assessments. Using both the output and input data reduces the risk of isolated or out-of-context evaluations, increasing the reliability of predictions. With metrics grounded in both the input and output, the iterative refinement process can make targeted adjustments that better address the specific needs or characteristics of the data.

Optionally, the first AI model and the second AI model may be the same or the machine learning model, the first AI model, and the second AI model may be the same AI model. Both options enable flexibility and efficiency in the system's design and operation, allowing it to adapt to varying levels of complexity, resource availability, and specific use cases. Together, these options enhance scalability and cost-effectiveness while simplifying deployment. They enable seamless transitions between stages of processing, ensuring that iterations proceed smoothly and outputs are cohesively refined. This is particularly valuable in scenarios requiring real-time decision-making or when resources are constrained.

When the first AI model and the second AI model are the same, it simplifies the system by using a single model for both initial output generation and subsequent refinement. This reduces the need for additional architectures or configurations, streamlining the integration process and making maintenance more straightforward. It also conserves computational and storage resources, as only one model needs to be deployed and managed, making the system more cost-effective and efficient.

Similarly, when the machine learning model, the first AI model, and the second AI model are all the same, the system gains the advantage of unified optimization. A single model handles all stages of processing, ensuring consistency in data analysis and output generation. This eliminates the risk of mismatches between models and maximizes the utility of the AI's capabilities. Furthermore, training becomes more straightforward because any updates or enhancements to the model apply universally across all stages of the process, reducing the complexity of training and refinement cycles.

Optionally, one or more of the steps of the method for generating data related to the recipient may be executed in a plurality of AI contexts, and the executing comprises: performing one or more of the steps in parallel across multiple AI contexts; or performing one or more of the steps in parallel across multiple AI contexts, selecting a subset of AI contexts based on the one or more performance metrics calculated for the plurality of AI contexts; or performing one or more of the steps in parallel across multiple AI contexts, selecting a subset of AI contexts based on the one or more performance metrics calculated for the plurality of AI contexts, and discarding AI contexts with performance metrics not meeting the criterium for completion.

These options improve efficiency, scalability, and precision in executing the method for generating data related to the recipient. By allowing one or more steps to be executed in a plurality of AI contexts, the system leverages parallelism to process data and generate outputs faster, enabling it to handle larger datasets or more complex scenarios effectively.

When steps are performed in parallel across multiple AI contexts, it enhances processing speed, as multiple scenarios or variations can be explored simultaneously. This is particularly useful for time-sensitive applications, where quick responses are critical.

The selection of a subset of AI contexts based on performance metrics improves accuracy and relevance, as it focuses the processing on the most promising contexts. This ensures that the outputs generated align more closely with predefined goals, such as optimizing customer engagement or product recommendations.

Discarding AI contexts with performance metrics that do not meet the criterium for completion further enhances resource efficiency, as it prevents the system from wasting computational power on low-value or irrelevant contexts. This optimization helps the system allocate resources effectively, focusing only on the contexts that contribute to achieving desired outcomes.

According to the embodiments of the method for generating data related to the recipient, the first output data comprises a sequence of tokens generated by the first AI model, the tokens being selected to match a predefined pattern. This enables the generation of structured and contextually relevant outputs by ensuring that the first AI model produces data in a format that adheres to predefined requirements. By selecting tokens to match a predefined pattern, the system can generate outputs that are not only meaningful but also align with specific structural or syntactical rules. This capability improves consistency and usability, particularly in applications where outputs must adhere to established templates, such as customer communications, marketing materials, or data processing workflows.

Additionally, this enhances the system's ability to interface with downstream processes that rely on structured inputs. By producing outputs in a predictable format, the method facilitates seamless integration with subsequent steps in the workflow, such as evaluation, refinement, or deployment, enabling efficient and automated processing throughout the system.

For example, instruction may be to generate subject for a marketing email, a pattern may be the generated subject so that the performance metrics are generated when and only when the output data contains an additional complete desired output such as the next subject.

According to some embodiments, the one or more performance metrics may be provided to the AI model by encoding the one or more performance metrics as tokenized text; or the one or more performance metrics may be provided to the AI model as special tokens representing the values of the one or more performance metrics. These two options enable flexible and precise integration of performance metrics into the AI model's processing workflow, improving how the model interprets and utilizes these metrics for generating outputs.

When the performance metrics are encoded as tokenized text, it allows the system to incorporate the metrics as part of the natural language input that the AI model processes. This method leverages the model's pretraining on text-based data, ensuring compatibility and enabling the AI to treat the metrics contextually, alongside other input data. This option is particularly effective when the performance metrics need to influence the generation of outputs in a way that is tightly linked to the linguistic context, such as adapting the tone or content of a message.

On the other hand, when the performance metrics are encoded as special tokens, it enables a more structured and efficient representation of these values. Special tokens act as dedicated placeholders within the input sequence, signaling specific numeric or categorical values directly to the model. This ensures that the performance metrics are clearly distinguishable from other input data, reducing ambiguity and enhancing the model's ability to process and apply them accurately. It is particularly advantageous in scenarios where the metrics play a direct role in guiding decisions, such as selecting the optimal response or action.

Both options enhance the AI model's ability to utilize performance metrics effectively, ensuring that these values influence the output generation in a meaningful and application-specific manner. By providing flexibility in how metrics are integrated, the system can adapt to various tasks and contexts, optimizing the relevance and quality of the generated outputs.

Optionally, the method may further comprise using the one or more performance metrics to select output data by: maximizing an expected outcome based on the one or more performance metrics; or implementing a reinforcement learning algorithm to balance exploration and exploitation strategies; or aligning the selection with predefined user preferences or constraints. These options enable targeted optimization and adaptability in selecting output data. By maximizing an expected outcome, the method ensures outputs are chosen to achieve the best possible results based on performance metrics. Using a reinforcement learning algorithm introduces a balance between exploring new possibilities and exploiting known successful strategies, fostering continuous improvement. Aligning the selection with predefined user preferences or constraints allows for customization, ensuring outputs meet specific goals or requirements. These options thus enhance the method's ability to generate precise, goal-oriented, and adaptable results.

The selection strategies may be for example search, policy optimizing and decoding strategies. The selection strategies comprise at least one of beam search, graph search, greedy search, contrastive decoding, hybrid search, A star, Q star, Q-learning, depth-first search, or breadth-first search. This enables the method to apply efficient and intelligent search techniques to select the most optimal output from a range of possibilities. By leveraging these strategies, the system can systematically explore and evaluate potential outputs to identify the best match for predefined goals or performance metrics. For example, beam search allows for exploring multiple paths simultaneously, balancing breadth and depth in the search process, while greedy search quickly selects the most promising option at each step, prioritizing speed. Advanced approaches like A-star or Q-learning introduce heuristics or reinforcement learning to guide the search toward optimal outcomes, particularly in complex or dynamic environments. These strategies improve precision, efficiency, and adaptability, ensuring that the selection process identifies outputs that maximize expected outcomes, align with user preferences, or adhere to specific constraints. By combining various search and decoding methods, the system can adapt to diverse contexts, from simple tasks to more complex decision-making scenarios.

The method for generating data related to the recipient according to any embodiments of the present disclosure may optionally further comprise one or more of the following: conditioning at least one of the first AI model or the second AI model based on at least one of: the one or more performance metrics, at least one of the one or more input data sets, or at least one of the first output data or the second output data; preprocessing the at least one of the one or more input data sets by performing at least one of: cleaning the input data; or enriching the input data; encoding the at least one of the one or more input data sets as embeddings; receiving one or more outcome data sets representing an outcome in response to the second output data and conditioning the machine learning model using at least one of the outcome data sets and at least one of: the one or more input data sets, the first output data, the second output data, the one or more performance metrics; receiving one or more outcome data sets representing an outcome in response to the second output data and conditioning at least one of the first AI model or the second AI model using at least one of the outcome data sets and at least one of: the one or more input data sets, the first output data, the second output data, the one or more performance metrics; storing embeddings of the one or more input data sets and reusing unchanged embeddings in subsequent processing steps; completion processing missing data in the one or more input data sets from existing data; clustering embeddings and selecting or generating one or more representative embeddings of the cluster instead of the original embeddings in the cluster; or repeating the steps of the method in accordance with any of the previous claims and changing the weight of data based on the time when the data was acquired or generated.

Each of these options contributes to making the method more flexible, efficient, accurate, and scalable, ensuring it can handle diverse use cases and adapt to changing requirements while maintaining high-quality outputs.

Conditioning at least one of the first AI model or the second AI model based on performance metrics, input data, or output data improves the contextual relevance of the models by tailoring their processing to the specific goals, data, and metrics. It ensures that the models generate outputs that are well-aligned with performance criteria and the broader context.

Preprocessing input data sets by cleaning or enriching them enhances data quality and usability by removing inconsistencies, errors, or irrelevant information and augmenting the data with additional, valuable context. Clean and enriched data enables more accurate and effective model processing.

Encoding input data sets as embeddings improves data representation and compatibility, allowing diverse data types to be transformed into uniform, dense vector formats. It facilitates efficient analysis and comparison within machine learning models, improving overall processing effectiveness.

Receiving outcome data sets and conditioning the machine learning model using them along with input and output data enhances learning and adaptability by incorporating real-world feedback (outcomes) into the model. It ensures the model evolves dynamically to improve its predictions and align better with actual results.

Receiving outcome data sets and conditioning at least one of the AI models using them improves refinement and optimization in AI outputs by leveraging feedback from outcomes to adjust how the AI models process data. It ensures that the models adapt to real-world performance and continually improve their results. The outcome encompassing actions, events, or changes related to the recipient in the physical or virtual world.

Storing embeddings and reusing unchanged embeddings in subsequent steps increases efficiency by reducing redundant computations. By caching and reusing embeddings, the system conserves resources and accelerates processing for repeated or unchanged data.

Completing missing data in the input data sets from existing data improves robustness and continuity by handling incomplete data seamlessly. It ensures the system can function effectively even when inputs are partial or fragmented, enhancing reliability.

Clustering embeddings and selecting representative embeddings for the cluster improves scalability and resource efficiency by reducing the dimensionality and volume of data processed. It allows the system to manage large data sets more effectively while retaining essential information for decision-making.

Repeating steps of the method while adjusting data weights based on acquisition or generation times enhances adaptability to temporal changes by emphasizing recent data and reducing the influence of outdated information. It ensures the system remains responsive to evolving conditions and current trends.

According to a second aspect, there is provided a system for selecting data related to a recipient, the system is configured to obtain one or more data sets; enrich data of the one or more data sets; normalize the data of the plurality of the data sets; form embeddings of the normalized data; and use machine learning to find from the embeddings a target embedding for a target recipient.

The system may be designed with a high degree of integration and interoperability, making it an addition to existing enterprise ecosystems. The system may interface with Customer Relationship Management systems (CRMs), Enterprise Resource Planning systems (ERPs), Customer Data Platforms (CDP), and other data platforms through its simple integration protocols employing various tools and methodologies.

The system may perform flexible content handling based on free formatted natural language text, eliminating the need for extensive data mapping. The sole exception pertains to identity information related to recipients, products, and deals which requires mapping to ensure precise data correlation and integrity. This streamlined integration approach not only facilitates smooth interoperability but also expedites the deployment process, enabling organizations to leverage the system's capabilities within their operational framework.

The system may incorporate several optimizations aimed at enhancing performance. These optimizations comprise of caching intermediate data and results, storing intermediate data in the GPU, employing sampling strategies, quantizing LLM weights and activations, and utilizing cached and approximated predictions. The system may employ keyword searches, structured data searches, and semantic searches for data enrichment. In generative AI literature, the semantic searches complementing data are often called Retrieval-Augmented Generation (RAG). In the system, the results of RAG are appended to each text $\lambda$, $\beta$, $\gamma$ and processed further according to the method as described in the first aspect.

Furthermore, the system supports the ingestion of images as input, similarly to text, for the parameters $\lambda$, $\beta$, $\gamma$, and $\delta$. The system may project the images into the embedding data set using a multimodal encoding or encoding-decoding LLM capable of handling both text and images within the same embedding data set. Similarly, with the expansion of LLM modalities, the system is designed to accommodate various input types, such as video, audio, and 3D models. The system enhances enterprise sales, marketing, service, and more through automated, personalized dialog optimization.

The system addresses domain ontologies across a broad spectrum of human situations and behaviors without explicit modelling. This is achieved through a two-fold approach: firstly the LLMs that normalize data and sample messages are trained on a corpus of data reflecting diverse life situations and have been pre-trained to incorporate domain knowledge. Secondly, the ML is trained to map complex dependencies within the one or more data sets, enabling the system to train and refine previously trained behavioral patterns.

To achieve optimal efficiency, the system can be trained through direct graphics processing unit (GPU) programming, emphasizing efficiency, continuous training, and parallelism. The architecture of the system is specifically designed to leverage the advantages of one or more GPUs in one or more computing nodes connected together, efficiently managing numerous simultaneous transactions through dynamic batching strategies. This optimization ensures that the system operates seamlessly, providing robust performance in a variety of scenarios.

The scalability of the LLM is achieved by scaling the LLM horizontally either as a third-party managed service, or as part of the system in cloud, on-premises or in hybrid or by scaling the system itself horizontally when utilizing an embedded LLM inference engine integrated to other components of the system. The system is designed to provide a flexible deployment architecture that caters to diverse organizational preferences, whether it's on-premises, on cloud platforms, or in a hybrid model. The system may be integrated with various LLMs, which can be either proprietary or open source. These LLMs may be hosted on-premises, in the cloud, or embedded within applications to offer a myriad of configuration possibilities to align with the specific deployment scenario or strategy. The deployment strategy of the system is crafted to meet the stringent requirements of entities in handling sensitive data. The system ensures that the privacy of the recipient is upheld, and data processing occurs within a secure paradigm.

Preliminary results validate the system's ability to efficiently explore a data set of messaging options and train effective messaging policies from responses. Online A/B tests show constant over 100% increase in conversion rate from the system-optimized messaging versus the control. Further, gains are observed when the system flexibly optimizes products, deals, and customer targeting in conjunction with messaging.

The test results confirm that automatically optimizing communications and interactions in a closed-loop system meaningfully improve business metrics.

The present disclosure thus provides a data processing system for generating data related to a recipient, the data processing system comprising a processor configured to perform the steps of the method of any one of the present embodiments. This system enables efficient, context-aware processing to produce personalized recommendations, messages, or insights, adapting dynamically to changing inputs and goals. By integrating advanced techniques like embeddings, clustering, and real-time conditioning, the system ensures high accuracy, scalability, and responsiveness.

According to another aspect, the present disclosure provides a machine-learning model for generating data related to a recipient, for use in the method of any one of the present embodiments, comprising: a feature extraction layer configured to process a plurality of input data sets related to a recipient; a prediction layer configured to calculate one or more prediction metrics associated with first output data generated by a first artificial intelligence (AI) model; an optimization layer configured to refine predictions using the one or more prediction metrics; and an output layer configured to generate second output data related to the recipient.

This enables a highly efficient and adaptable machine-learning pipeline for generating personalized and optimized outputs related to a recipient. The feature extraction layer ensures that diverse input data sets are preprocessed and transformed into meaningful representations, facilitating effective downstream processing. The prediction layer provides insights by calculating metrics that assess the initial outputs' alignment with performance goals. The optimization layer refines these predictions, improving accuracy and relevance by leveraging the calculated metrics. Finally, the output layer generates the refined second output data, ensuring it is tailored to the recipient's specific context or requirements. This structured approach enhances precision, adaptability, and the overall quality of the system's outputs.

According to another aspect, the present disclosure provides a computer-implemented method of training the machine-learning model for generating data related to a recipient, wherein the method comprises: receiving an input training dataset comprising a plurality of input data sets and corresponding target output data sets; initializing the feature extraction layer to process input data sets and generate embeddings; training the prediction layer to calculate prediction metrics associated with the target output data; and optimizing the machine-learning model through iterative training cycles using loss minimization techniques to align predicted outputs with target outputs.

This enables the development of a robust and accurate machine-learning model for generating personalized data related to a recipient. By receiving input training datasets with corresponding target outputs, the method ensures that the model learns from real-world examples, enhancing its ability to generalize. The initialization of the feature extraction layer prepares the data for processing, converting it into embeddings that capture essential features. The training of the prediction layer calculates metrics that align model outputs with desired targets, while iterative optimization using loss minimization techniques continuously refines the model. This improves the model's performance, making it capable of delivering precise, context-aware, and goal-oriented outputs tailored to a recipient's specific needs.

According to another aspect, the present disclosure provides a computer-implemented method of generating a training dataset for the machine-learning model, the method comprising: receiving a plurality of input data sets related to a recipient; generating target output data sets using a predefined set of rules or annotations; associating input data sets with corresponding target output data sets; and formatting the input and target data sets into a structured format compatible with the machine-learning model.

This enables the creation of high-quality, structured training datasets essential for building an effective machine-learning model. By receiving input data sets and generating target output data sets based on predefined rules or annotations, the method ensures that the training data is both relevant and aligned with the desired outcomes. Associating the input data with corresponding target outputs creates a clear mapping for the model to learn from. Finally, formatting the data into a structured format compatible with the machine-learning model facilitates seamless integration into the training pipeline, improving the model's accuracy, efficiency, and ability to generalize to real-world scenarios.

According to another aspect, the present disclosure provides a training dataset for use in the method of training the machine-learning model, comprising: a plurality of input data sets related to a recipient, including structured and unstructured data; and corresponding target output data sets that specify desired second output data related to the recipient.

This enables the development of a versatile and well-trained machine-learning model by providing a comprehensive and diverse training dataset. The inclusion of both structured and unstructured data ensures that the model learns to handle a wide variety of real-world input scenarios, capturing nuanced patterns and relationships. The corresponding target output data sets specify clear goals for the model, allowing it to learn precise mappings between inputs and desired outputs. This comprehensive dataset improves the model's ability to generate accurate, context-aware, and goal-oriented outputs, enhancing its overall performance and applicability to complex tasks.

According to another aspect, the present disclosure provides a use of the method of any one of the present embodiments for at least one of: personalized content generation; targeted marketing campaigns; customer relationship management; automated customer service; automated customer representative; automating contact center operations; dynamic recommendation systems; and predictive analytics for user engagement. This enables the application of the method across diverse domains where personalization, automation, and data-driven decision-making are critical. For personalized content generation, the method creates tailored messages or recommendations that resonate with individual users. In targeted marketing campaigns, it optimizes audience segmentation and messaging to improve engagement and conversions. For customer relationship management, the method enhances interactions by leveraging data to provide timely and relevant insights. In automated customer service and representative operations, it streamlines responses and solutions, improving efficiency and satisfaction. For contact center automation, the method enables dynamic, real-time handling of customer queries with minimal human intervention. Dynamic recommendation systems benefit from precise matching of products or services to user preferences, while predictive analytics for user engagement anticipates behaviors, enabling proactive strategies to enhance user retention and satisfaction. Overall, it facilitates scalable, efficient, and impactful solutions across industries.

According to another aspect, the present disclosure provides a computer program for generating data related to a recipient, the computer program comprising instructions which, when executed by a processor, cause the processor to carry out the method of any one of the present embodiments. This enables the automation and implementation of the method for generating data related to a recipient in a scalable and reproducible way. By providing a computer program with executable instructions, the method can be seamlessly deployed on various systems and platforms. It allows the processor to execute tasks such as analyzing input data, applying AI models, refining outputs, and optimizing results according to predefined performance metrics. This ensures consistency, efficiency, and accuracy in generating personalized outputs, making the solution accessible and adaptable across different operational environments.

According to another aspect, the present disclosure provides a computer program product for generating data related to a recipient, the computer program product comprising computer program code comprising instructions that, when executed by a processor, cause the processor to perform the method according to any one of the present embodiments. This enables the packaging and distribution of the method for generating data related to a recipient as a ready-to-use solution. By providing a computer program product with executable code, it facilitates easy deployment on various hardware or software systems. Once executed by a processor, the program automates the steps of the method, including data processing, AI-driven analysis, and iterative refinement. This allows businesses or users to implement the solution quickly and efficiently, ensuring consistent, scalable, and accurate generation of personalized outputs tailored to recipients.

DETAILED DESCRIPTION OF THE DRAWINGS

FIG. 1 is an exemplary diagram 100 of a method that illustrates relations and interactions between a recipient and an entity (e.g., a business enterprise) in accordance with an implementation of the disclosure. The exemplary diagram 100 depicts a brand and product affinity mapping 102, a behavioral insight graph 104, a product journey tracker 106, a persona message resonance 108, a context message confluence 110, and a product voice mapping 112. The exemplary diagram 100 further includes a recipient related axes 120, a brand and product dynamics matrix 122, a context matrix axis 124, and a message axis 126. The recipient related axes 120, the brand and product dynamics matrix 122, the context matrix axis 124, and the message axis 126 are correlated based on interactions 102, 104, 106, 108, 110, and 112.

The method continuously and automatically analyses all key relations of recipient communication to train an Artificial Intelligence (AI) model. The method continuously and automatically trains the AI model across one or more recipients, e.g., a user or a customer, and their interactions, thereby accumulating unparalleled business insights that extend across brands, products, segments, and situations of an entity (e.g., a business enterprise). The method may train AI model based on relationships to optimize current dialogues and enhance the method's robustness with each interaction. The method is trained and improved continuously, thereby provide unprecedented responsiveness to the changing market conditions and trends.

In the brand and product affinity mapping 102, the method may analyse recipient personas and determines the relation between different recipient personas and one or more brands and products of the enterprise. For example, the one or more brands can be Apple®, Microsoft®, Samsung®, etc. For example, the one or more products can be iPhone, MacBook, ThinkPad, etc. The method may predict a recipient's probability to engage, purchase, or suggest a brand to the recipient using a relation between the recipient personas and the one or more brands and products, thereby enabling the one or more brands to continuously customize their approach for different segments and individual recipients.

In the behavioral insight graph 104, the method may determine the interest of the recipient that corresponds to each purchase, communication, or website visit of the recipient and generates a picture based on the interest of the recipient. The method may determine recipient's needs, preferences, and potential pain points by determining the relation between the recipient's personas and recipient's history.

In the product journey tracker 106, the method may map the one or more brands and the one or more products with contexts of the recipient's history, thereby enabling the one or more brands to strategically position their products, promoting upselling, cross-selling, and maintaining consistent brand narratives.

In the persona message resonance 108, the method may determine optimal messages that resonate with specific recipient personas. The method ensures an alignment between a message and an expectation and an emotional state of the recipient during an event for example a marketing pitch or a support response.

In the context message confluence 110, the method ensures the creation of impactful and resonant dialogues that engage and lead to conversions by aligning messages with a recipient's purchase history, prior communications, and web browsing patterns.

In the product voice mapping 112, the method ensures the consistency of voice with a brand, while also being dynamic to adapt to changing recipient perceptions and market scenarios.

Figure 2:
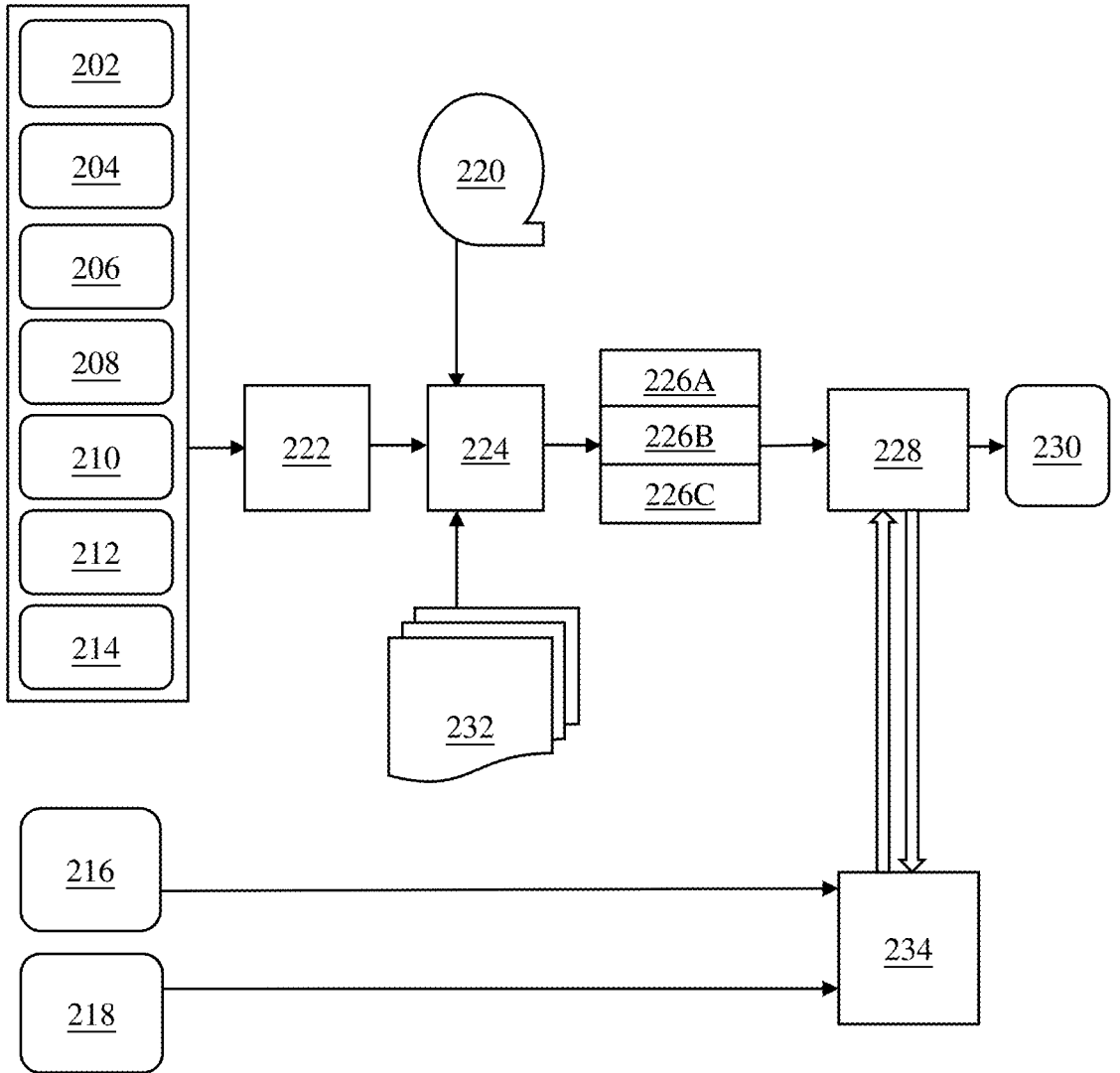
FIG. 2 is an exemplary view of a method for selecting data related to a recipient in accordance with an implementation of the disclosure.

FIG. 2 is an exemplary view of a method for selecting data related to a recipient in accordance with an implementation of the disclosure. The exemplary view depicts personal data 202, transaction data 204, recipient data 206, marketing data 208, support data 210, partner data 212, public data 214, prior outcomes 216, new outcomes 218, prompts 220, a data enrichment layer 222, a large language model (LLM) layer 224, first embedding 226A, second embedding 226B, third embedding 226C, a Machine learning (ML) model 228, expected outcomes 230, templates 232 and a parallel online training pipeline 234. The data enrichment layer 222 obtains data of one or more data sets. The one or more data set may include the personal data 202, the transaction data 204, the recipient data 206, the marketing data 208, the support data 210, the partner data 212, and the public data 214. The data enrichment layer 222 enriches the data of the one or more data sets. The LLM layer 224 normalizes the data of the one or more data sets. The LLM layer 224 may generate a plurality of messages. The LLM layer 224 may extract embeddings. The LLM layer 224 forms embeddings, e.g., a first embedding 226A, a second embedding 226B, and a third embedding 226C of the normalized data. The ML model 228 finds a target embedding for a target recipient from the embeddings, e.g., the first embedding 226A, the second embedding 226B, and the third embedding 226C. For example, outcomes can be revenue growth, profitability improvement, customer satisfaction, productivity, etc. The ML model 228 is trained based on the prior outcomes 216 in in the background. The ML model 228 is retrained by incorporating the new outcomes 218 received from the parallel online training pipeline 234. The ML model 228 is retrained to keep the ML model 228 updated in near real-time. The ML model 228 is continuously trained to predict the expected outcomes 230 of a specific message delivered to the target recipient.

Figures 3, 4:
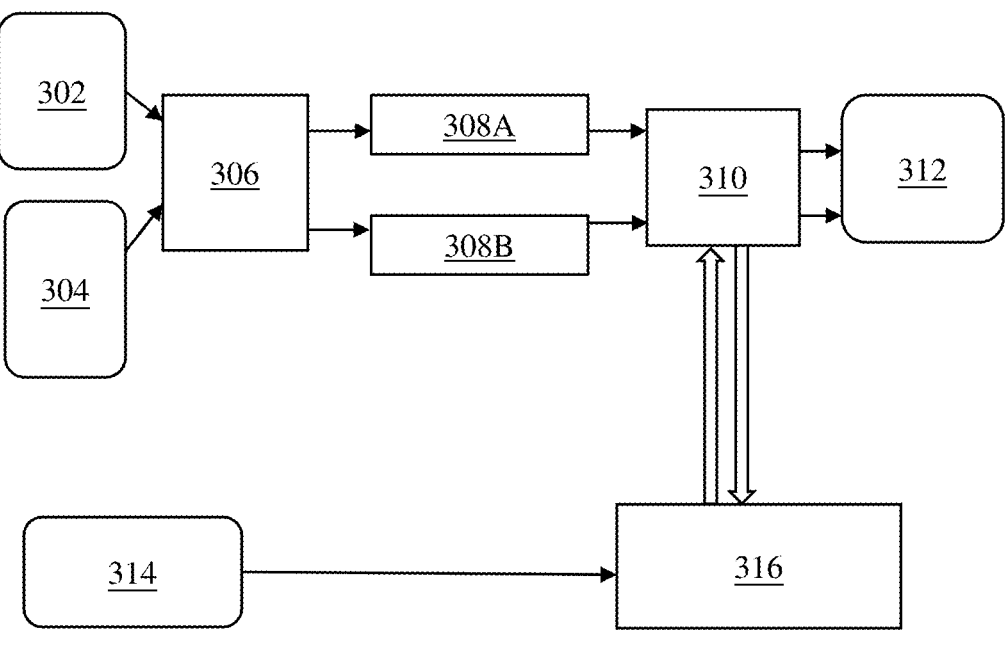
FIG. 3 illustrates an exemplary view of a method for implementing reinforcement learning to continuously optimize recipient sales dialog in accordance with an implementation of the disclosure.
FIG. 4 illustrates an exemplary view of a method for handling unstructured data in accordance with an implementation of the disclosure.

FIG. 3 illustrates an exemplary view of a method for implementing reinforcement learning to continuously optimize recipient sales dialog in accordance with an implementation of the disclosure. The exemplary view depicts first data 302, second data 304, a large language model (LLM) layer 306, first embedding 308A, second embedding 308B, a Machine Learning (ML) model 310, expected outcomes 312, outcomes 314, and a parallel online training pipeline 316. The first embedding 308A is created for the first data 302 and the second embedding 308B is created for the second data 304. For example, the first data 302, and the second data 304 can be data related to one or more products and recipients. The ML model 310 is trained to identify an appropriate message for the expected outcomes 312 from embeddings, e.g., the first embedding 308A, and the second embedding 308B. The LLM layer 306 generates messages for both the first data 302 and the second data 304 separately. For example, the messages can be marketing messages. Optionally, separate embeddings are created for the first data 302, and the second data 304.

FIG. 4 illustrates an exemplary view of a method 400 for handling unstructured data in accordance with an implementation of the disclosure. The exemplary view depicts data 402, a large language model (LLM) layer 404, embedding 406, a Machine Learning (ML) model 408, expected outcomes 410, outcomes 412, and a parallel online training pipeline 414. The LLM layer 404 is used as a feature extractor to extract unstructured data or structured data, e.g., text, and images. The LLM layer 404 may search, extract, and summarize parameters of each data. The LLM layer 404 applies LLM capabilities such as transformers to understand the interdependencies of the data 402, and to provide normalized data, which is normalized and standardized regardless of each data set. When handling unstructured data, there is no requirement for a developer or a recipient to define or implement mappings or conversions from one or more inputs. The LLM layer 404 can manage an input of any text, thereby enabling scalability to accommodate any recipients, situations, or data types. The LLM layer 404 normalizes the data 402 before it undergoes machine learning applications. This normalization process optimizes the data, addressing its diverse formats, content variations, and disparities. As a result, the LLM layer 404 enhances efficiency, reduces customization efforts, provides adaptability to a changing environment, and accelerates integration and validation timeline.

Figure 5:
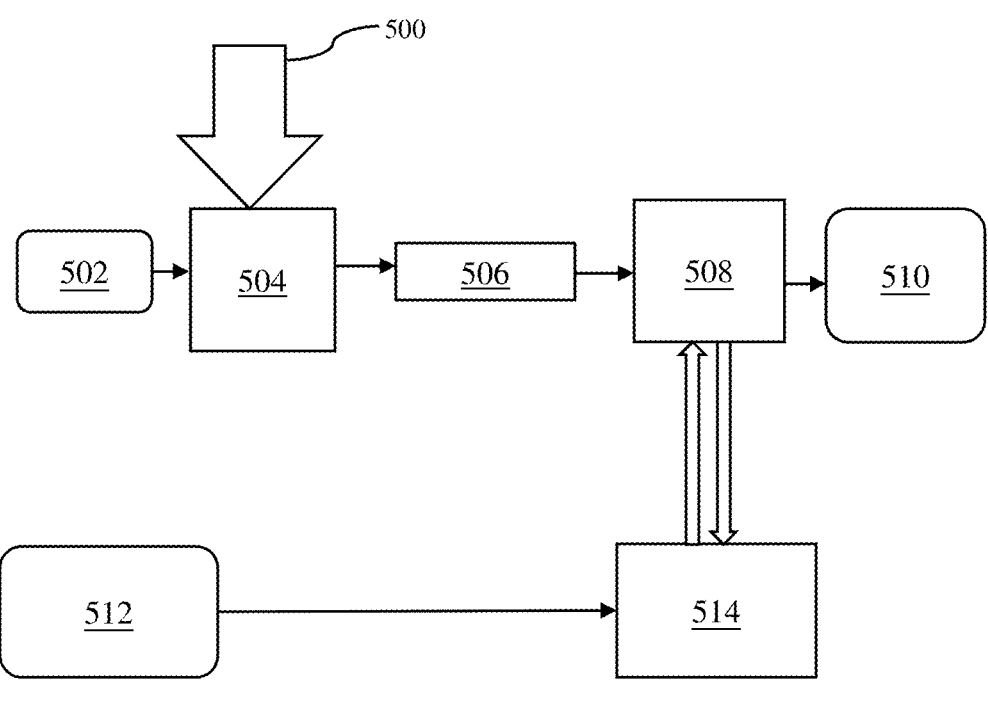
FIG. 5 illustrates an exemplary view of a method for handling missing data in accordance with an implementation of the disclosure.

FIG. 5 illustrates an exemplary view of a method 500 for handling missing data in accordance with an implementation of the disclosure. The exemplary view depicts data 502, a large language model (LLM) layer 504, embedding 506, a Machine Learning (ML) model 508, expected outcomes 510, outcomes 512, and a parallel online training pipeline 514. The LLM layer 504 generates values for missing data and derives the missing data from existing data when applicable. For example, if a person's residence is indicated as California, the LLM layer 504 assumes they live in the USA, even if the country is not mentioned. The LLM layer 504 may mark up the missing data as "missing". When handling the missing data, there is no requirement for developers or recipients to define strategies or policies. The LLM layer 504 handles the missing data and offers scalability across various recipients, situations, or data types without a need for manual intervention, thereby enabling fast deployment and time-to-market for the recipients. Without effective handling, missing data could disrupt machine learning models, preventing them from learning altogether or leading to inaccurate insights. The method can handle the missing data, thereby ensuring the model's robustness, facilitating accurate learning, and enhancing overall performance.

Figure 6:
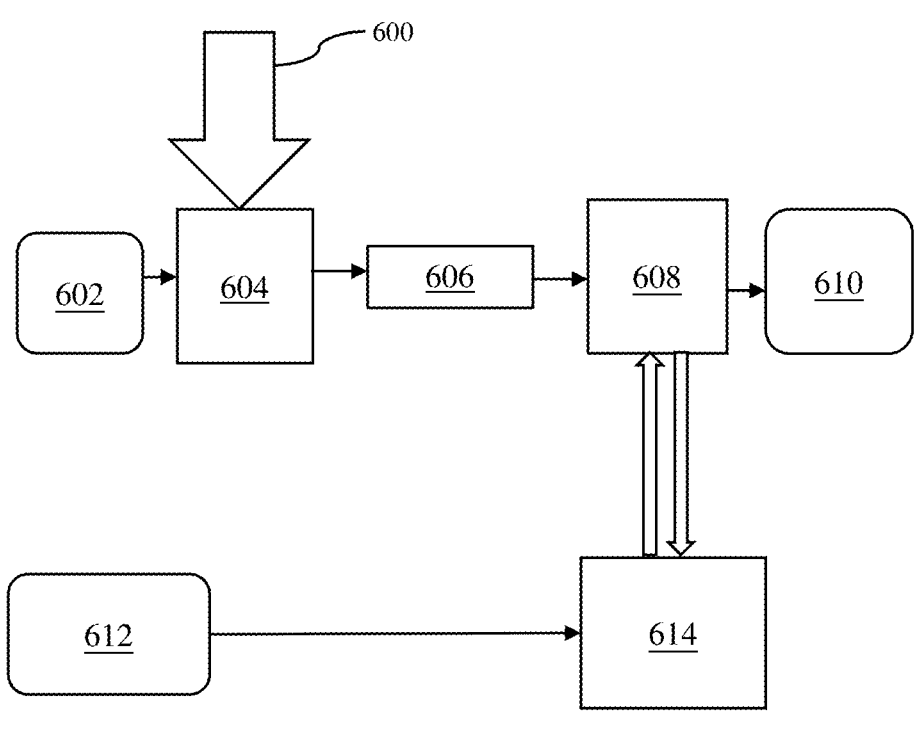
FIG. 6 illustrates an exemplary view of a method for normalizing data and feature extraction in accordance with an implementation of the disclosure.

FIG. 6 illustrates an exemplary view of a method 600 for normalizing data and feature extraction in accordance with an implementation of the disclosure. The exemplary view depicts data 602, a large language model (LLM) layer 604, embedding 606, a Machine Learning (ML) model 608, expected outcomes 610, outcomes 612, and a parallel online training pipeline 614. The LLM layer 604 is used as a feature extractor to extract unstructured or structured data, e.g., text, and images. The LLM layer 604 may search, extract, and summarize parameters of each data. The LLM layer 604 applies LLM capabilities such as transformers to understand interdependencies of the data 602, and to provide normalized data, which is normalized and standardized regardless of each data set. For example, a long browsing history is normalized as a statement that summarizes intent of the recipient, instead of a long list of web pages. When normalizing data and feature extraction, there is no requirement for a developer or recipient to define or implement mappings or conversions from various inputs. The LLM layer 604 can manage the input of any text, thereby enabling scalability to accommodate any recipients, situations, or data types. The LLM layer 604 provides a solution for normalizing the data 602 by ensuring compatibility among different data types. This compatibility is important for effective utilization in machine learning processes. The method has the capability to standardize diverse data types with varying structures and lengths optimizes integration process, enabling seamless utilization in machine learning models.

Figure 7:
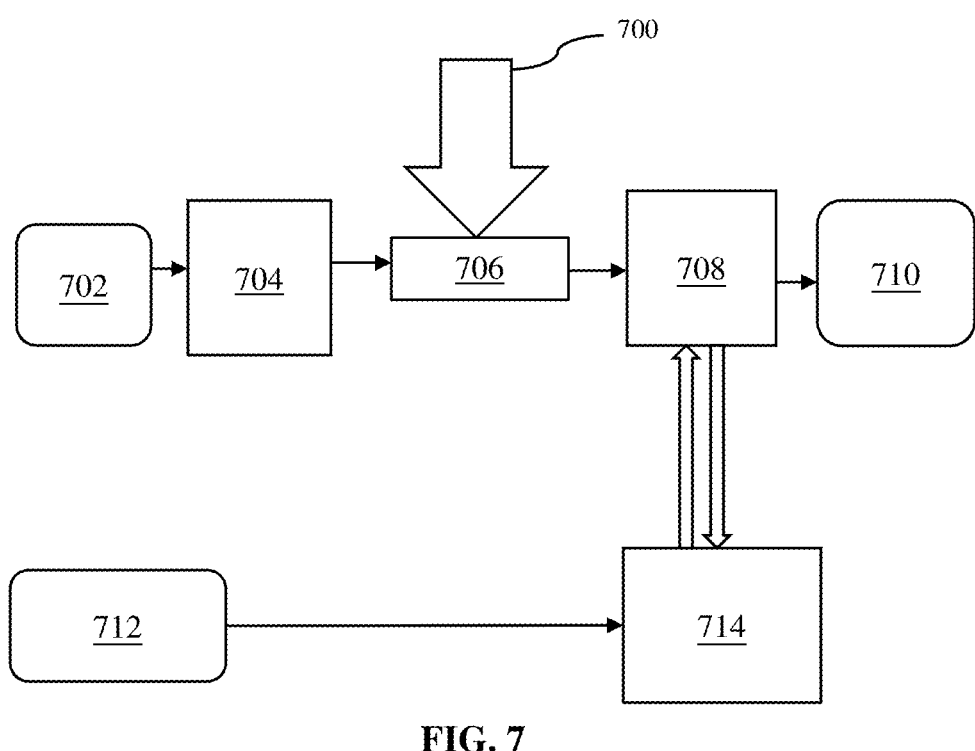
FIG. 7 illustrates an exemplary view of a method for representing data in accordance with an implementation of the disclosure.

FIG. 7 illustrates an exemplary view of a method 700 for representing data in accordance with an implementation of the disclosure. The exemplary view depicts data 702, a large language model (LLM) layer 704, embedding 706, a Machine Learning (ML) model 708, expected outcomes 710, outcomes 712, and a parallel online training pipeline 714. The method may employ an encoding LLM to individually project each data, e.g., recipient data, contextual data, and product data into an embedding. Each embedding is a vector of predetermined length; for example, embeddings can be of vectors of equal length for example 768 or 1536, where the LLM layer 704 semantically maps data 702 to an embedding 706. Additional scalar values in the data 702 may be appended to an end of the vector in a predetermined position in the vector; for example, the scalar values can be price or a lead time of a product. When representing data 702, there is no requirement for a developer or a recipient to define or implement mappings or conversions from various inputs. The LLM layer 704 can manage the input of any text, thereby enabling scalability to accommodate any recipients, situations, or data types. Even after normalization, some of the data may be a varying type. The method addresses this challenge by representing the data 702 that enables meaningful comparisons between different data types for relative similarity. The method represents each different data into a comparable standardized data set where different data can be compared for semantic similarity.

Figure 8:
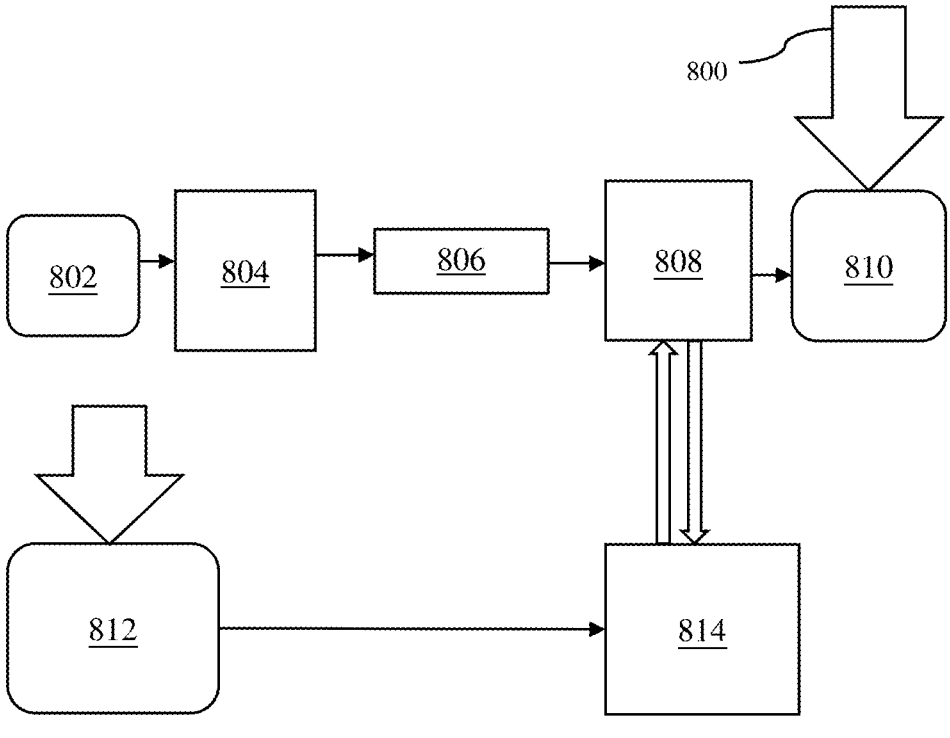
FIG. 8 illustrates an exemplary view of a method for representing outcomes in accordance with an implementation of the disclosure.

FIG. 8 illustrates an exemplary view of a method 800 for representing outcomes 812 in accordance with an implementation of the disclosure. The exemplary view depicts data 802, a large language model (LLM) layer 804, embedding 806, a Machine Learning (ML) model 808, expected outcomes 810, outcomes 812, and a parallel online training pipeline 814. The method assigns a value for each outcome event; for example, the outcome event can be purchase, subscription, or cancellation. This is done externally to the method, serving as a parameterization when the method is deployed. For example, in automation of cellular subscription upsells, the value assigned to each purchase reflects an increased price corresponding to a previous one. Similarly, cancellation of a subscription can be assigned a value equivalent to −2 times of the value of a preceding subscription. This valuation aims to incentivize the ML model 808 toward upselling while discouraging actions that might lead to the cancellation of existing subscriptions. Optionally, the outcomes 812 can also be discounted by time. For example, a purchase made today holds a higher value than a purchase in a month. The method can be used in any business optimization process without modifications; for example, the business optimization process can be to optimize conversion rates in a marketing and sales pipeline. Further, representing the outcomes enables scalability to any entity, recipient, situation, or data. The method represents different outcomes in a comparable manner. Hence, the ML model 808 can be trained to optimize the total outcome whether consisting of one or several metrics (KPIs).

Figure 9:
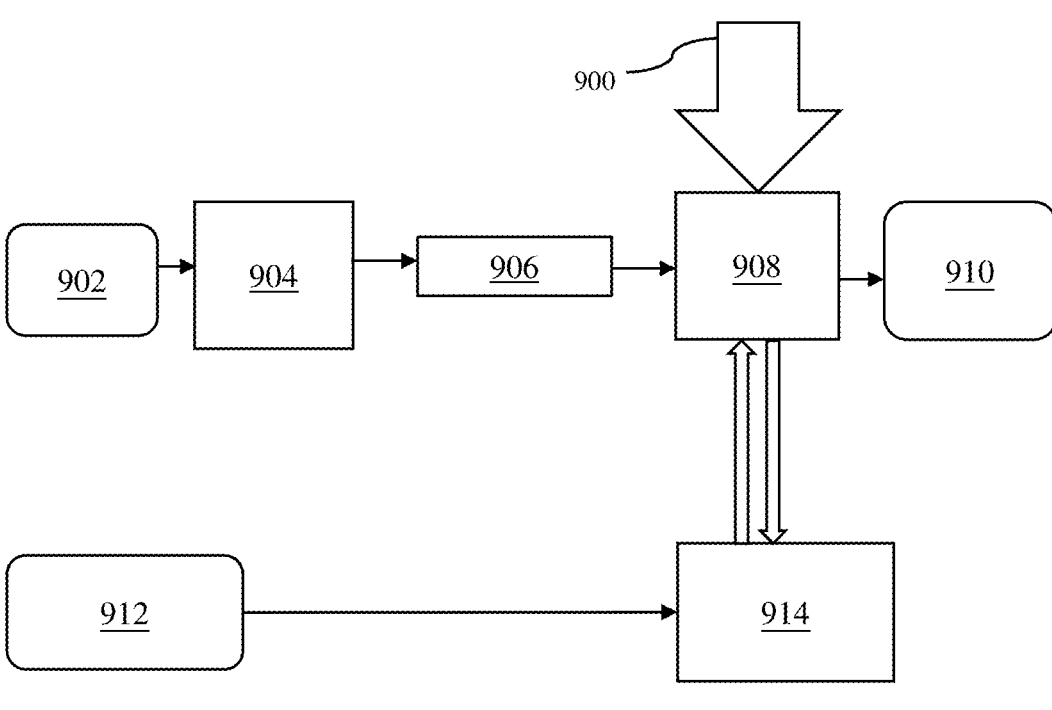
FIG. 9 illustrates an exemplary view of a method for learning recipient behavior in accordance with an implementation of the disclosure.

FIG. 9 illustrates an exemplary view of a method 900 for training recipient behavior in accordance with an implementation of the disclosure. The exemplary view depicts data 902, a large language model (LLM) layer 904, embedding 906, a Machine Learning (ML) model 908, expected outcomes 910, outcomes 912, and a parallel online training pipeline 914. The method concatenates fixed size embeddings into an input vector and a sum of all outcomes related to a specific recipient. The sum of outcomes can be discounted by time from time of each message to time of each outcome. The ML model 908 is trained to predict the expected outcomes 910 from the concatenated embeddings. Input includes a predefined type of data, e.g., recipient, context, and product in deterministic positions in the input vector. The ML model 908 is automatically trained based on business dynamics and recipient behavior to the extent that explaining data is available through recipient actions or inactions and without the need for the entity to perform any action. The ML model 908 is trained based on the recipient's behavior without a need for human intervention, feature engineering, or guidance. If there is no information in inputs, such as it is noise with respect to the outcomes 912, the ML model 908 is trained to ignore that data by assigning low weights for such inputs. The method enables scalability to any recipient, situation, or data. The method has powerful prediction accuracy and robustness. The ML model 908 is trained automatically with all the aspects of the recipient's behavior for predicting the outcomes (e.g., the expected outcomes 910).

Figure 10:
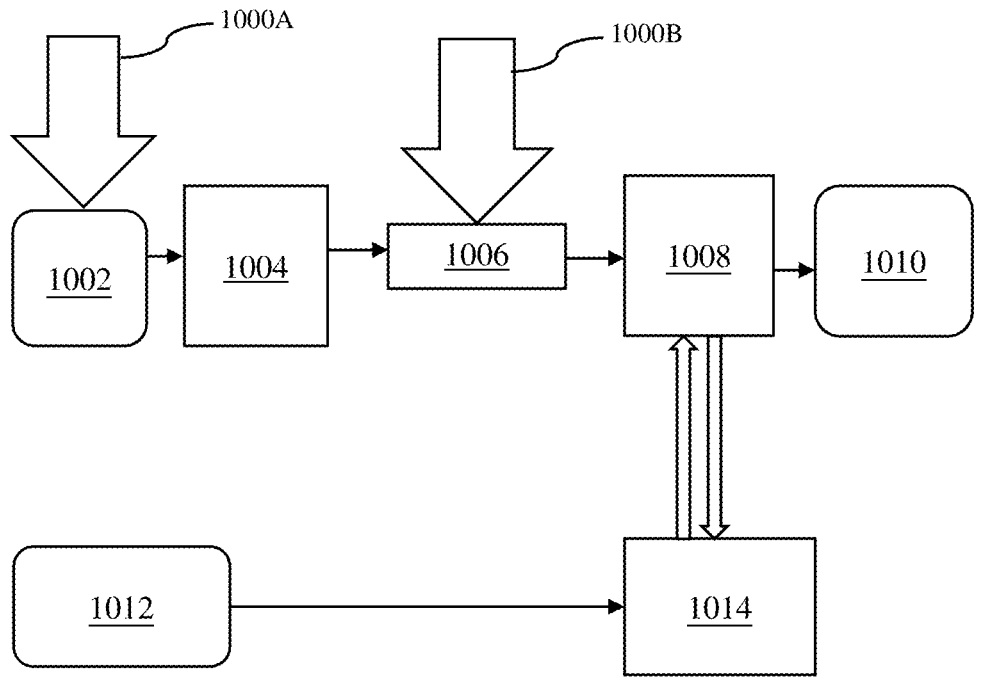
FIG. 10 illustrates an exemplary view of a method for caching of data in accordance with an implementation of the disclosure.

FIG. 10 illustrates an exemplary view of a method (1000A, and 1000B) for caching data in accordance with an implementation of the disclosure. The exemplary view depicts data 1002, a large language model (LLM) layer 1004, embedding 1006, a Machine Learning (ML) model 1008, expected outcomes 1010, outcomes 1012, and a parallel online training pipeline 1014. The method may store all embeddings for each data 1002. The method may store a hash of the data 1002. If a hash has not changed, the method uses embedding 1006 instead of LLM processing. The LLM processing is 1000×-1 million times more resource intensive (CPU/GPU/memory) than the ML model 1008. The method performs in near real-time as only changed data goes through the LLM layer 1004, and other data, i.e., cached embeddings only through the ML model 1008 which has a latency in the order of milliseconds. This enables real-time web page rendering, e.g., competitive performance<30 millisecond (ms) latency, and interactive voice e.g., competitive performance<300 ms latency. The method may store intermediate steps of calculation and determine a need for the intermediate steps when a recalculation is needed to eliminate the LLM processing.

Figure 11:
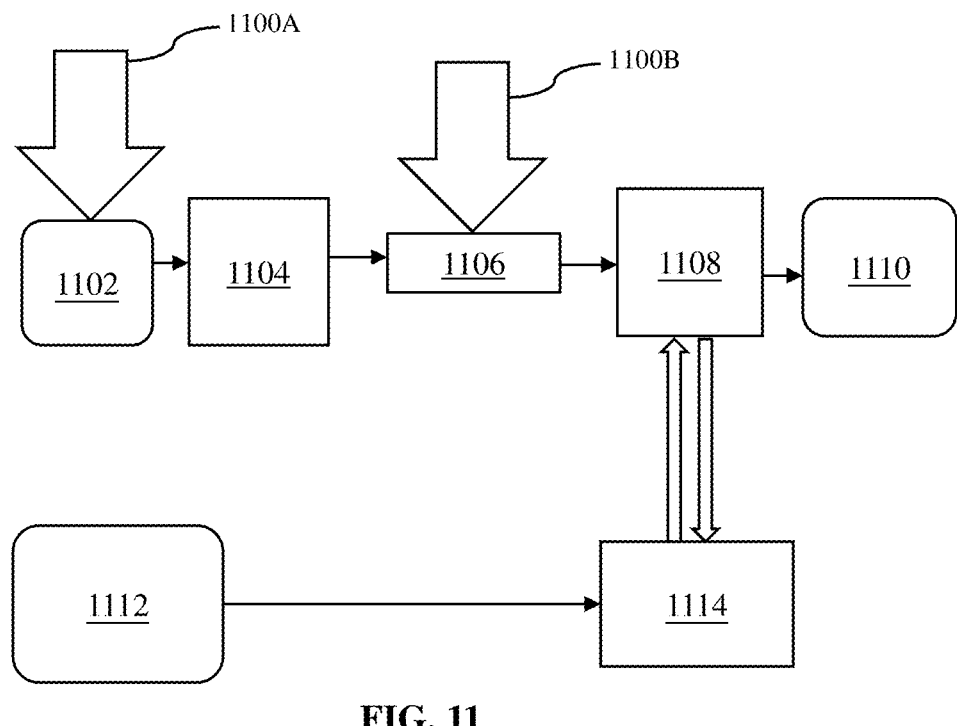
FIG. 11 illustrates an exemplary view of a method for approximation of embeddings in accordance with an implementation of the disclosure.

FIG. 11 illustrates an exemplary view of a method (1100A and 1100B) for approximation of embeddings in accordance with an implementation of the disclosure. The exemplary view depicts data 1102, a large language model (LLM) layer 1104, embedding 1106, a Machine Learning (ML) model 1108, expected outcomes 1110, outcomes 1112, and a parallel online training pipeline 1114. The method (i) uses LLM-calculated data, or (ii) searches for the nearest embedding using a KNN (K-Nearest Neighbors) or similar proximity search or clustering algorithm potentially using a lookup table within an available time limit. The lookup table may include a key, where the key is a combination of embedding of the previous version of the changed data and embedding of the latest change and a corresponding value is the resulting embedding. The method further calculates full LLM data in the background and updates the lookup table when needed once completed. The method performs user embedding based on a previous version of changed data and ignores a recent change within the available time limit. The method responds within a set maximum time-frame with available information at that time and supports real-time applications. For example, the set maximum time-frame can be 30-1000 ms; the set maximum time-frame can be 100 ms, 200 ms, 300 ms, 400 ms, 500 ms, 600 ms, 700 ms, 800 ms, 900 ms or 1000 ms. The method approximates the embeddings for data 1102 that cannot be processed in the time needed for the use case.

Figure 12:
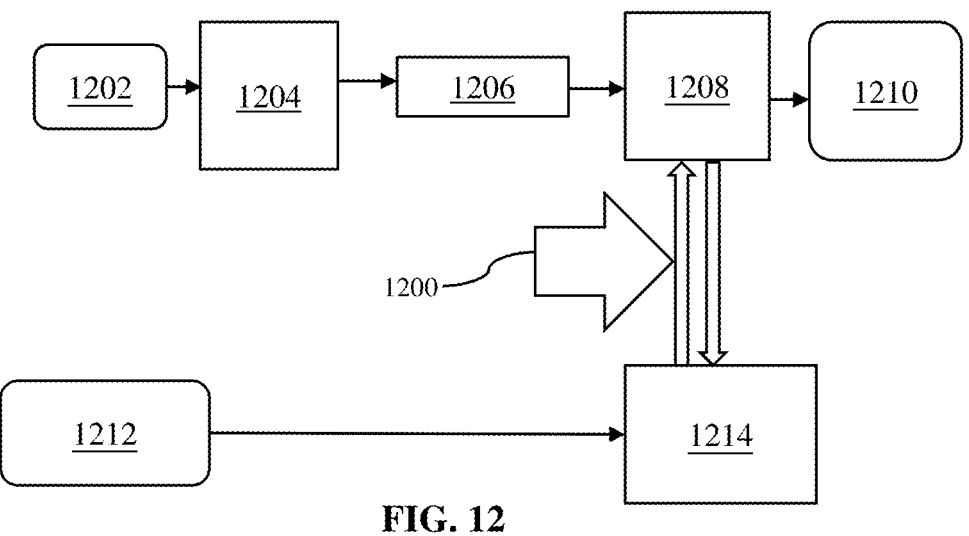
FIG. 12 illustrates an exemplary view of a method for continuous training of a Machine learning (ML) model in accordance with an implementation of the disclosure.

FIG. 12 illustrates an exemplary view of a method 1200 for continuous training of a Machine learning (ML) model 1208 in accordance with an implementation of the disclosure. The exemplary view depicts data 1202, a large language model (LLM) layer 1204, embedding 1206, the ML model 1208, expected outcomes 1210, outcomes 1212, and a parallel online training pipeline 1214. The method continuously, in parallel to serving a model, retrains the ML model 1208 with all previous data. The method decays older data over time to emphasize new information when available. When the ML model 1208 is updated, the method automatically deploys for serving. The method may promptly react to quick changes and trends in a market. The process of data decay facilitates the automatic replacement of older data, potentially obsolete data with more recent information. The ML model 1208 is continuously trained to accommodate all new information received. This changed information may include new inputs, new outcomes, and the absence of outcomes. Even if no new data has been received, an optimum model can be slightly different, as there is a different time passed from each data point. For example, no response to direct emails over extended time is new information that does not favor similar responses.

Figure 13:
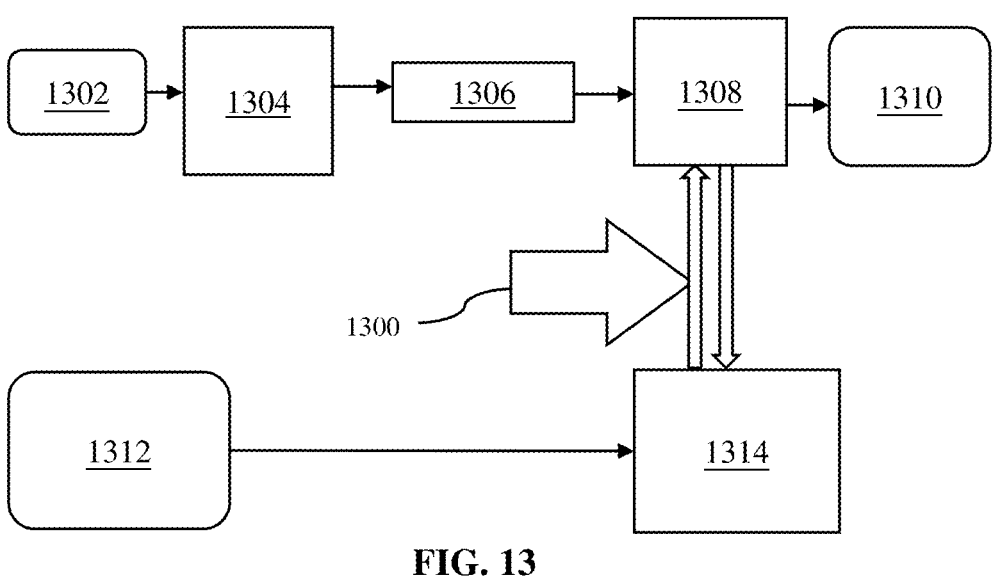
FIG. 13 illustrates an exemplary view of a method for continuous training optimization of the ML model in accordance with an implementation of the disclosure.

FIG. 13 illustrates an exemplary view of a method 1300 for continuous training optimization of a Machine Learning (ML) model 1308 in accordance with an implementation of the disclosure. The exemplary view depicts data 1302, a large language model (LLM) layer 1304, embedding 1306, the ML model 1308, expected outcomes 1310, outcomes 1312, and a parallel online training pipeline 1314. The method performs continuous training optimization to reduce a volume of the data 1302 to a fixed length. Optionally, fixed-length data can be trained in a predictable time. The method performs continuous training optimization to summarize embedding data, e.g., using clustering algorithms to represent multiple data points as one data point. For example, the clustering algorithms can be such as k-means. The one data point may be potentially weighted. The method performs continuous training optimization using any of the known clustering algorithms. For example, a training vector size is fixed as 1 million vectors and represents billions of vectors as their clustered 1 million means. Continuous retraining can be set to run at a constant time allowing consistent responsiveness of the method to changes in the environment, also over time even with increasing data. The method can be tuned between accuracy and responsiveness by adjusting a number of vectors representing training data. The method strategically drops out training data points that do not contribute to the learning.

Figure 14:
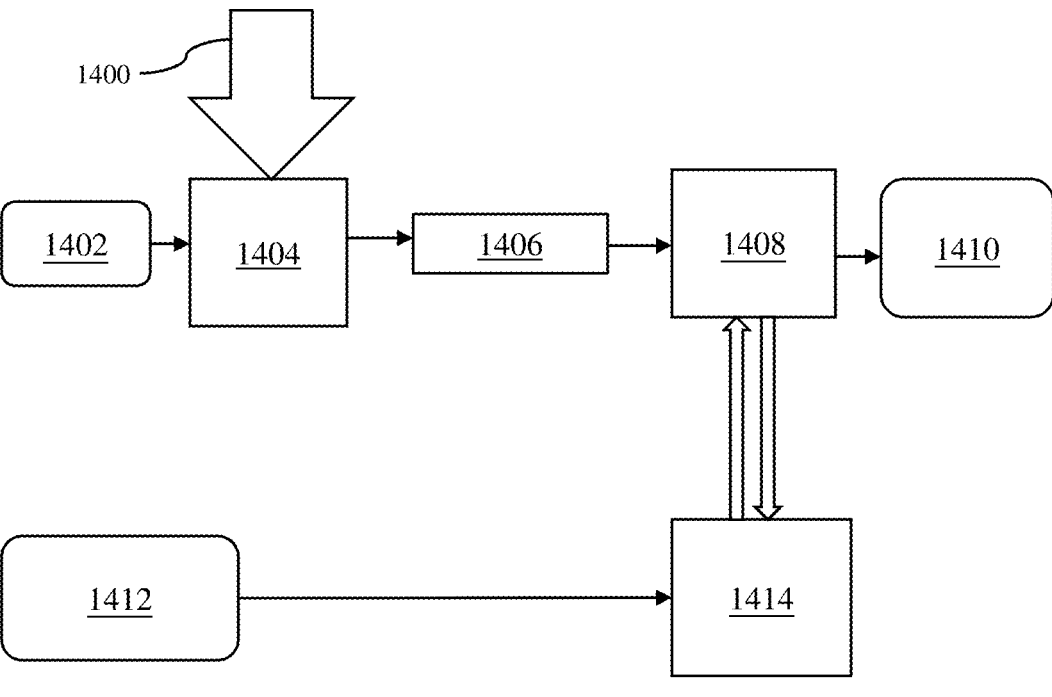
FIG. 14 illustrates an exemplary view of a method for sampling of messages in accordance with an implementation of the disclosure.

FIG. 14 illustrates an exemplary view of a method 1400 for sampling of messages in accordance with an implementation of the disclosure. The exemplary view depicts data 1402, a large language model (LLM) layer 1404, embedding 1406, a Machine Learning (ML) model 1408, expected outcomes 1410, outcomes 1412, and a parallel online training pipeline 1414. The method uses a decoder LLM to sample a message data set (Δ) by prompting the message data set (Δ) to (i) generate alternative messages conditionally to all normalized inputs and (ii) explore different perspectives. The LLM layer 1404 not only focuses on a prompt but also adeptly considers the messages that are generated by the LLM layer 1404, paying attention to all the messages, thereby ensuring efficient and effective production of a well-distributed array of meaningful alternative messages. The method generates high-quality alternative messages which allow for exploring and selecting a desired message in any situation. In addition, while generating the alternative messages, the method may extract the most recent message, use ML to predict its outcome, and insert value tokens into the output token sequence. These value tokens are configured to instruct the LLM of the expected value of the most recent message. The value tokens may be expressed in natural language, as numerical values encoded into tokens, or as specials tokens reserved for expressing the value. The value tokens are further configured to inform the LLM on the merits of each previously generated message. As the LLM attends previously generated messages with their value tokens while generating the next message, the value tokens implicitly help the LLM to guide its search towards the desired distribution, for example in the simplest case towards the highest predicted value, constituting of a form of a MCMC method.

The method efficiently samples high-quality messages that can be tested using the prediction for their expected outcome 1410, enabling the method to choose the message with the desired outcome. An example of a desired outcome is outcome value expectation maximization, or a stochastic selection criteria such as a higher outcome, the more probably that message is selected by the method.

Figures 15, 16:
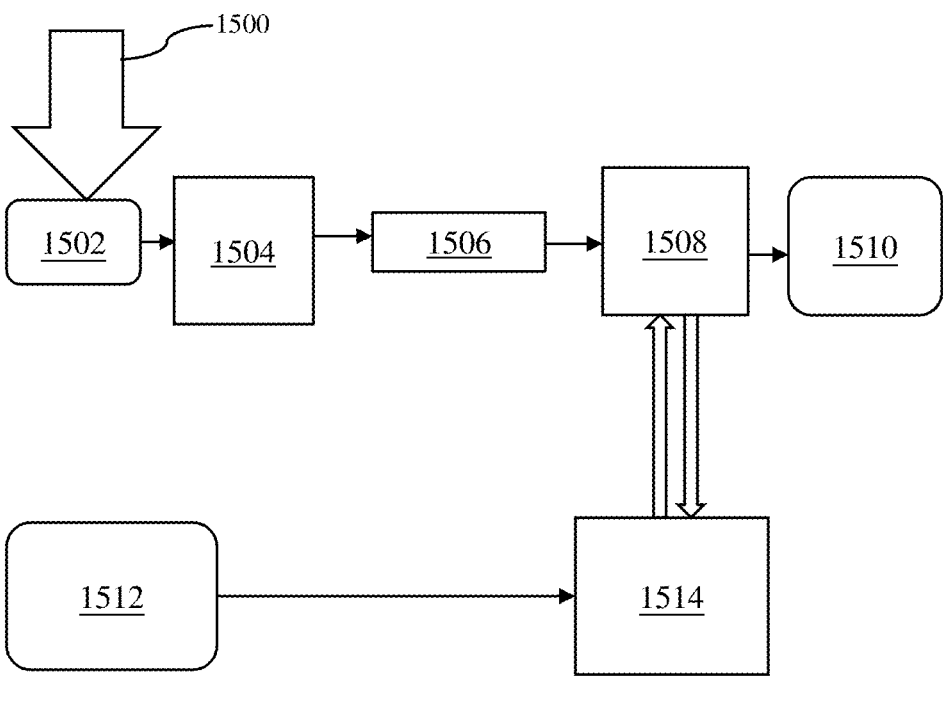
FIG. 15 illustrates an exemplary view of a method for iterating data inputs in accordance with an implementation of the disclosure.
FIG. 16 illustrates an exemplary view of a method for privacy, compliance, and universal training in accordance with an implementation of the disclosure.

FIG. 15 illustrates an exemplary view of method 1500 for iterating data in accordance with an implementation of the disclosure. The exemplary view depicts data 1502, a large language model (LLM) layer 1504, embedding 1506, a Machine Learning (ML) model 1508, expected outcomes 1510, outcomes 1512, and a parallel online training pipeline 1514. The method enables a recipient to select any brand, product, deal, promotion, recipient, or context, and to evaluate all or a desire subset of combinations for their cumulative expected outcomes 1510 using a user interface. The method enables the recipient to perform optimized targeting, product recommendations, pricing, bundling, and new product introduction based on the optimized expected outcomes 1510, thereby enabling optimization of a business. The method generates combinations of the desired data points for an evaluation system and selects the best message and predicts the expected outcomes 1510. For example, the method analyzes one or more recipients and one or more products, selects 1000 with the highest expected outcome 1510, and sends an email and a message to each recipient individually to promote a customized product. For example, the method may write a product description of variants A and B of a new product and evaluate both against all recipients to determine the highest expected outcome 1510.

FIG. 16 illustrates an exemplary view of a method 1600 for privacy, compliance and universal training in accordance with an implementation of the disclosure. The exemplary view depicts data 1602, a large language model (LLM) layer 1604, embedding 1606, a Machine Learning (ML) model 1608, expected outcomes 1610, outcomes 1612, and a parallel online training pipeline 1614. The method does not train or fine-tune LLMs with entity data or recipient data. The method only trains the ML model 1608 which has already abstracted out sensitive data. The method uses out-of-the-shelf LLM models for feature extraction and message sampling. The LLM does not leak sensitive data, as they are not trained with the sensitive data and logically cannot contain such data. Training of the ML model 1608 can be based on multiple recipients and entities used together depending on commercial terms of usage. However, some recipients or entities may choose not to participate. This is possible because the training doesn't involve any sensitive data. For example, the ML model 1608 doesn't include information that a recipient A bought a red Tesla. Instead, the ML model 1608 may be trained based on information that a woman between 30 and 40 years old will choose red 37% of the time and other colors 63% of the time. When allowed, the method may train and accumulate ML level training across multiple recipients, e.g., hundreds of thousands of recipients, and multiple transactions, e.g., trillions of transactions, causing the method to train fundamental business dynamics of one or more entities.

Figure 17:
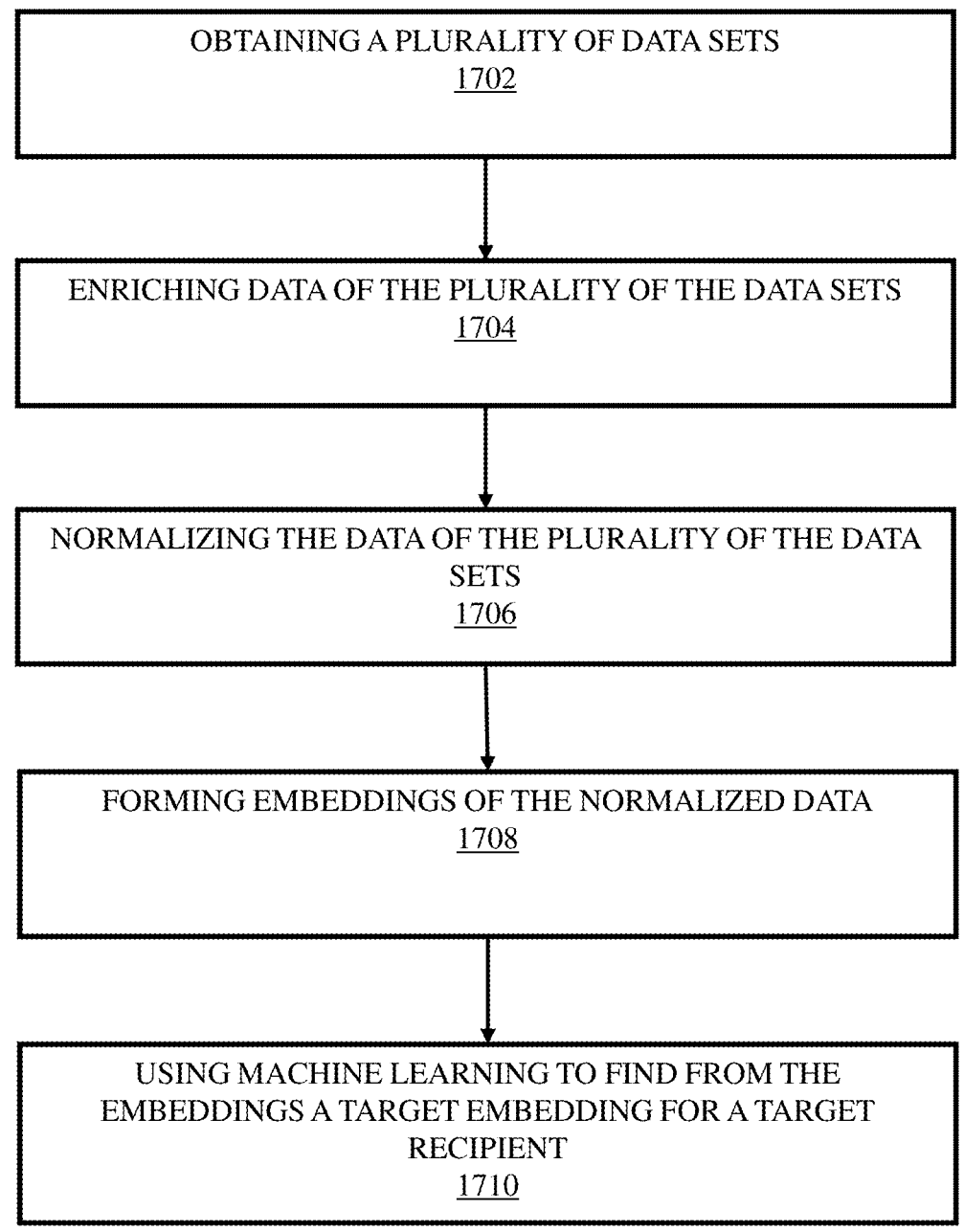
FIG. 17 is flow diagram that illustrate a method for selecting data related to a recipient in accordance with an implementation of the disclosure.

FIG. 17 are flow diagrams that illustrate a method for selecting data related to a recipient in accordance with an implementation of the disclosure. At a step 1702, one or more data sets are obtained. At a step 1704, data of the one or more data sets is enriched. At a step 1706, the data of the one or more data sets is normalized. At a step 1708, embeddings of the normalized data are formed. At a step 1710, machine learning is used to find from the embeddings a target embedding for a target recipient.

Figure 18:
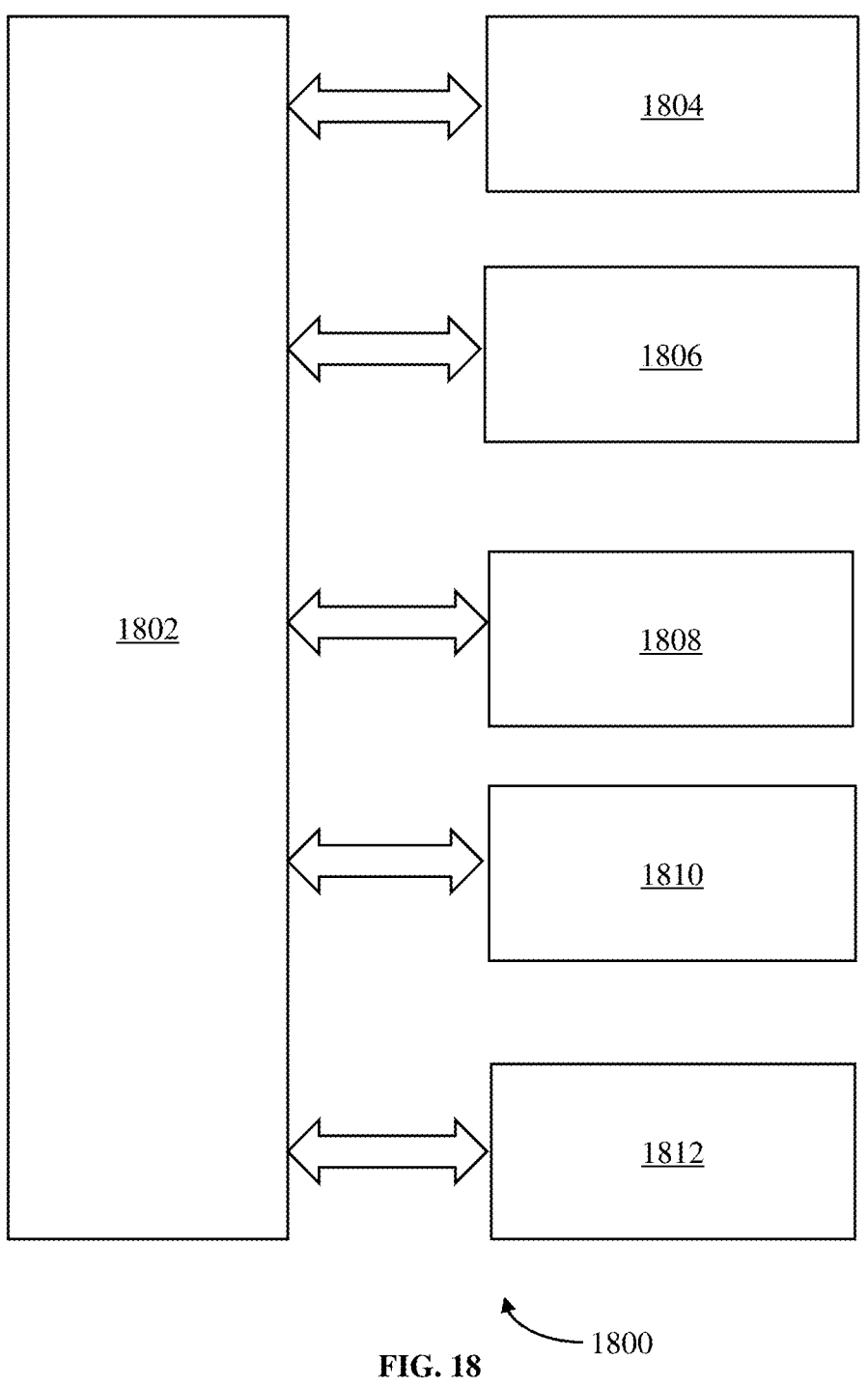
FIG. 18 is an illustration of a computer system (e.g., a system) in which the various architectures and functionalities of the various previous implementations may be implemented.

FIG. 18 is an illustration of a computer system (e.g., a system) in which the various architectures and functionalities of the various previous implementations may be implemented. As shown, the computer system 1800 includes at least one processor 1804 that is connected to a bus 1802, wherein the computer system 1800 may be implemented using any suitable protocol, such as Peripheral Component Interconnect, PCI-Express, Accelerated Graphics Port, AGP, Hyper Transport, or any other bus or point-to-point communication protocol. The computer system 1800 also includes a memory 1806.

Control logic (software) and data are stored in the memory 1806 which may take a form of random-access memory, RAM. In the disclosure, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation and make substantial improvements over utilizing a conventional central processing unit, CPU, and bus implementation. Of course, the various modules may also be situated separately or in various combinations of semiconductor platforms per the desires of a user.

The computer system 1800 may also include a secondary storage 1810. For example, the secondary storage 1810 may be a hard disk drive and a removable storage drive, representing a floppy disk drive, a magnetic tape drive, a compact disk drive, digital versatile disk, DVD drive, recording device, universal serial bus, and USB flash memory. The removable storage drives at least one of reads from and writes to a removable storage unit in a well-known manner.

Computer programs, or computer control logic algorithms, may be stored in at least one of the memory 1806 and the secondary storage 1810. Such computer programs, when executed, enable the computer system 1800 to perform various functions as described in the foregoing. The memory 1806, the secondary storage 1810, and any other storage are possible examples of computer-readable media.

In an implementation, the architectures and functionalities depicted in the various previous figures may be implemented in the context of the processor 1804, a graphics processor coupled to a communication interface 1812, an integrated circuit (not shown) that is capable of at least a portion of the capabilities of both the processor 1804 and a graphics processor, a chipset (namely, a group of integrated circuits designed to work and sold as a unit for performing related functions, and so forth).

Furthermore, the architectures and functionalities depicted in the various previous-described figures may be implemented in a context of a general computer system, a circuit board system, a game console system dedicated for entertainment purposes, an application-specific system. For example, the computer system 1800 may take the form of a desktop computer, a laptop computer, a server, a workstation, a game console, an embedded system.

Furthermore, the computer system 1800 may take the form of various other devices including, but not limited to a personal digital assistant, PDA device, a mobile phone device, a smart phone, a television, and so forth. Additionally, although not shown, the computer system 1800 may be coupled to a network (for example, a telecommunications network, a local area network, LAN, a wireless network, a wide area network, WAN such as the Internet, a peer-to-peer network, a cable network, or the like) for communication purposes through an I/O interface 1808.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

The invention claimed is:

1. A method for generating data related to a recipient, the method comprising:

receiving, by at least one processor one or more input data sets relevant to the recipient;

identifying, by the at least one processor, one or more performance metrics associated with generating data related to the recipient, the performance metrics arranged to quantify one or more aspects of interest related to the recipient;

executing a generation process comprising:

analyzing, by a first artificial intelligence (AI) model executing on one or more processing units, at least one of the one or more input data sets in combination with one or more instructions, to generate first output data;

applying, by a machine learning model executing on the one or more processing units, the first output data to calculate one or more performance metrics, the machine learning model configured to optimize the calculated performance metrics; and processing by a second AI model executing on the one or more processing units, the calculated performance metrics in combination with the one or more input data sets to generate second output data iteratively repeating the generation process until a criterium for completion has been satisfied, wherein the criterium updates model parameters or embeddings to improve an accuracy of generated data; and outputting, by the at least one processor, the second output data to a computer readable storage medium.

2. The method according to claim 1, wherein iteratively repeating the generation process comprises introducing the second output data directly as the first output data for further processing or as part of the input data sets, to be processed alongside other input data.

3. The method according to claim 1 wherein at least one performance metric represents a predicted outcome in response to the first output data, the outcome encompassing actions, events, or changes in the physical or virtual world.

4. The method according to claim 1, wherein the first AI model and the second AI model are the same AI model or wherein the machine learning model, the first AI model, and the second AI model are the same AI model.

5. The method according to claim 1, wherein the one or more performance metrics are calculated using the first output data in conjunction with at least one of the one or more input data sets.

6. The method according to claim 1, comprising executing one or more of the steps in a plurality of AI contexts, and the executing comprises:

performing one or more of the steps in parallel across multiple AI contexts; or performing one or more of the steps in parallel across multiple AI contexts, selecting a subset of AI contexts based on the one or more performance metrics calculated for the plurality of AI contexts; or performing one or more of the steps in parallel across multiple AI contexts, selecting a subset of AI contexts based on the one or more performance metrics calculated for the plurality of AI contexts, and discarding AI contexts with performance metrics not meeting the criterium for completion.

7. The method according to claim 1, wherein the first output data comprises a sequence of tokens generated by the first AI model, the tokens being selected to match a predefined pattern.

8. The method according to claim 1, wherein the one or more performance metrics is provided to the AI model by encoding the one or more performance metrics as tokenized text; or the one or more performance metrics is provided to the AI model as special tokens representing the values of the one or more performance metrics.

9. The method according to claim 1, wherein the method further comprises using the one or more performance metrics to select output data by:

maximizing an expected outcome based on the one or more performance metrics; or implementing a reinforcement learning algorithm to balance exploration and exploitation strategies; or aligning the selection with predefined user preferences or constraints.

10. The method according to claim 9, wherein the selection strategies comprise at least one of beam search, graph search, greedy search, contrastive decoding, hybrid search, A star, Q star, Q-learning, depth-first search, or breadth-first search.

11. The method according to claim 1, wherein the method further comprises one or more of the following:

conditioning at least one of the first AI model or the second AI model based on at least one of: the one or more performance metrics, at least one of the one or more input data sets, or at least one of the first output data or the second output data;

preprocessing the at least one of the one or more input data sets by performing at least one of: cleaning the input data; or enriching the input data;

encoding the at least one of the one or more input data sets as embeddings;

receiving one or more outcome data sets representing an outcome in response to the second output data and conditioning the machine learning model using at least one of the outcome data sets and at least one of: the one or more input data sets, the first output data, the second output data, the one or more performance metrics;

receiving one or more outcome data sets representing an outcome in response to the second output data and conditioning at least of the first AI model or the second AI model using at least one of the outcome data sets and at least one of: the one or more input data sets, the first output data, the second output data, the one or more performance metrics;

storing embeddings of the one or more input data sets and reusing unchanged embeddings in subsequent processing steps;

completion processing missing data in the one or more input data sets from existing data;

clustering embeddings and selecting or generating one or more representative embeddings of the cluster instead of the original embeddings in the cluster; or changing the weight of data based on the time when the data was acquired or generated.

12. A data processing system for generating data related to a recipient, the data processing system comprising a processor configured to perform the steps of the method of claim 1.

13. A machine-learning model for generating data related to a recipient, for use in the method of claim 1, comprising:

a feature extraction layer configured to process a plurality of input data sets related to a recipient;

a prediction layer configured to calculate one or more prediction metrics associated with first output data generated by the first artificial intelligence (AI) model;

an optimization layer configured to refine predictions using the one or more prediction metrics; and an output layer configured to generate second output data related to the recipient.

14. A computer-implemented method of training the machine-learning model of claim 13 for generating data related to a recipient, wherein the method comprises:

receiving an input training dataset comprising a plurality of input data sets and corresponding target output data sets;

initializing the feature extraction layer to process input data sets and generate embeddings;

training the prediction layer to calculate prediction metrics associated with the target output data; and optimizing the machine-learning model through iterative training cycles using loss minimization techniques to align predicted outputs with target outputs.

15. A computer-implemented method of generating a training dataset for the machine-learning model of claim 13, the method comprising:

receiving a plurality of input data sets related to a recipient;

generating target output data sets using a predefined set of rules or annotations;

associating input data sets with corresponding target output data sets; and formatting the input and target data sets into a structured format compatible with the machine-learning model.

16. A training dataset for use in the method of claim 14 of training the machine-learning model, comprising:

a plurality of input data sets related to a recipient, including structured and unstructured data; and corresponding target output data sets that specify desired second output data related to the recipient.

17. Use of the method of claim 1 for at least one of:

personalized content generation;

targeted marketing campaigns;

customer relationship management;

automated customer service;

automated customer representative;

automating contact center operations;

dynamic recommendation systems; and predictive analytics for user engagement.

18. A computer program for generating data related to a recipient, the computer program comprising instructions which, when executed by a processor, cause the processor to carry out the method of claim 1.

19. A computer program product for generating data related to a recipient, the computer program product comprising computer program code comprising instructions that, when executed by a processor, cause the processor to perform the method according to claim 1.

\*   \*   \*   \*   \*